(12) United States Patent
Shrestha et al.

(10) Patent No.: US 11,737,146 B2
(45) Date of Patent: Aug. 22, 2023

(54) RESOURCE SELECTION ASSOCIATED WITH TWO-STEP RANDOM ACCESS PROCEDURES

(71) Applicant: QUALCOMM Incorporated, San Diego, CA (US)

(72) Inventors: Bharat Shrestha, San Diego, CA (US); Liangping Ma, San Diego, CA (US); Umesh Phuyal, San Diego, CA (US); Xiao Feng Wang, San Diego, CA (US); Ayan Sengupta, San Diego, CA (US); Alberto Rico Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 143 days.

(21) Appl. No.: 17/149,648

(22) Filed: Jan. 14, 2021

(65) Prior Publication Data

US 2022/0225415 A1 Jul. 14, 2022

(51) Int. Cl.
*H04W 74/08* (2009.01)
*H04W 28/02* (2009.01)
*H04W 72/21* (2023.01)
*H04W 72/566* (2023.01)

(52) U.S. Cl.
CPC ... *H04W 74/0833* (2013.01); *H04W 28/0278* (2013.01); *H04W 72/21* (2023.01); *H04W 72/569* (2023.01)

(58) Field of Classification Search
CPC ......... H04W 74/0833; H04W 28/0278; H04W 72/1242; H04W 72/1284
See application file for complete search history.

(56) References Cited

U.S. PATENT DOCUMENTS

| | | | |
|---|---|---|---|
| 2018/0124822 A1* | 5/2018 | Wang | H04W 74/006 |
| 2018/0139778 A1* | 5/2018 | Chou | H04W 74/006 |
| 2019/0132857 A1* | 5/2019 | Babaei | H04W 72/1273 |
| 2020/0112994 A1* | 4/2020 | Zhang | H04L 27/261 |
| 2020/0245373 A1* | 7/2020 | Xiong | H04W 74/0833 |
| 2020/0314913 A1* | 10/2020 | Rastegardoost | H04W 74/006 |
| 2020/0351801 A1* | 11/2020 | Jeon | H04W 52/48 |
| 2021/0051712 A1* | 2/2021 | Hedayat | H04W 16/14 |
| 2021/0099933 A1* | 4/2021 | Matsuda | H04W 36/0055 |

* cited by examiner

*Primary Examiner* — Dinh Nguyen
(74) *Attorney, Agent, or Firm* — Holland & Hart LLP; Daog M. Vo

(57) ABSTRACT

Methods, systems, and devices for wireless communication are described. A communication device, such as a user equipment (UE) may identify information for transmitting to a base station of a non-terrestrial network. The UE may identify that one or more resources allocated for transmitting the information are available based at least in part on identifying the information. The one or more resources include one or more types of uplink resources including physical random access channel (PRACH) resources or physical uplink shared channel (PUSCH) resources for the random access procedure, a PUSCH for a scheduling request (SR), or a physical uplink control channel (PUCCH) for a configured grant, or a combination thereof. As a result, the UE may transmit, to the base station, a message over the one or more resources allocated for the information based at least in part on identifying the one or more resources.

30 Claims, 12 Drawing Sheets

US 11,737,146 B2

RESOURCE SELECTION ASSOCIATED WITH TWO-STEP RANDOM ACCESS PROCEDURES

FIELD OF TECHNOLOGY

The following relates to wireless communication, including resource selection associated with two-step random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may be a terrestrial network or a non-terrestrial network, or a combination thereof. These wireless communications systems may support one or multiple random access procedures (e.g., a random access channel (RACH) procedure) for establishing a connection between a UE and a base station. Examples of random access procedures may include a two-step RACH procedure and a four-step RACH procedure. As demand for communication efficiency increases, some wireless communications systems, such as non-terrestrial networks, may be unable to support high reliability or low latency random access operations, among other examples.

SUMMARY

Various aspects of the described techniques relate to configuring a communication device, which may be a UE, to select resources (e.g., random access resources) for a random access procedure in a non-terrestrial network. The UE may be configured to perform a random access procedure over a specified bandwidth part (BWP), which may be configured for one or multiple random access procedures. For example, a BWP may be configured for a two-step RACH procedure or a four-step RACH procedure, or both. When a BWP is configured to support multiple random access procedures (e.g., a two-step RACH procedure and a four-step RACH procedure), the UE may be configured to select a type of the resources (e.g., random access resources) for the random access procedure the UE selects to perform over the BWP. That is, if a BWP allocated for a random access procedure is configured with both types of random access procedures (e.g., two-step RACH and four-step RACH), the UE may set the type to two-step RACH based on one or more factors as described herein. Additionally or alternatively, a communication device, such as a base station may configure a type of resource for the UE to use for a scheduling request (SR), a buffer status report (BSR), or uplink data.

For example, the UE may be configured to use random access resources (e.g., associated with a two-step RACH procedure) or uplink resources (e.g., physical uplink control channel (PUCCH) resources) for communicating the SR. Alternatively, the base station may configure both types of resources for the SR. The UE may use the SR to request uplink resources (e.g., uplink shared channel (UL-SCH) resources) for uplink communications. The UE may be further configured to select between random access resources (e.g., associated with a two-step RACH procedure) and uplink resource (e.g., PUCCH resources) for transmitting an SR. Additionally or alternatively, the UE may be configured to select between a contention free random access procedure (e.g., a contention free two-step RACH procedure) or a configured grant (also referred to as a semi-persistent grant) to address challenges (e.g., larger propagation delays, etc.) in a non-terrestrial network.

A method for wireless communication at a UE is described. The method may include identifying information for transmitting to a base station of a non-terrestrial network, identifying that one or more resources allocated for transmitting the information are available based on identifying the information, wherein the one or more resources comprise one or more types of uplink resources including PRACH resources or PUSCH resources for the random access procedure, a PUSCH for an SR, or a PUCCH for a configured grant, or a combination thereof, and transmitting, to the base station, a message over the one or more resources allocated for the information based on identifying the one or more resources.

An apparatus for wireless communication at a UE is described. The apparatus may include a processor, memory coupled with the processor, and instructions stored in the memory and operable, when executed by the processor, to cause the apparatus to identify information for transmitting to a base station of a non-terrestrial network, identify that one or more resources allocated for transmitting the information are available based on identifying the information, wherein the one or more resources comprise one or more types of uplink resources including PRACH resources or PUSCH resources for the random access procedure, a PUSCH for an SR, or a PUCCH for a configured grant, or a combination thereof, and transmit, to the base station, a message over the one or more resources allocated for the information based on identifying the one or more resources.

Another apparatus for wireless communication at a UE is described. The apparatus may include means for identifying information for transmitting to a base station of a non-terrestrial network, means for identifying that one or more resources allocated for transmitting the information are available based on identifying the information, wherein the one or more resources comprise one or more types of uplink resources including PRACH resources or PUSCH resources for the random access procedure, a PUSCH for an SR, or a PUCCH for a configured grant, or a combination thereof, and means for transmitting, to the base station, a message over the one or more resources allocated for the information based on identifying the one or more resources.

A non-transitory computer-readable medium storing code for wireless communication at a UE is described. The code may include instructions executable by a processor to identify information for transmitting to a base station of a non-terrestrial network, identify that one or more resources allocated for transmitting the information are available based on identifying the information, wherein the one or more resources comprise one or more types of uplink resources including PRACH resources or PUSCH resources for the random access procedure, a PUSCH for an SR, or a PUCCH for a configured grant, or a combination thereof, and transmit, to the base station, a message over the one or more resources allocated for the information based on identifying the one or more resources.

Some examples of the method, apparatuses, and non-transitory computer-readable medium described herein may further include operations, features, means, or instructions for identifying a BWP allocated for a random access procedure, where the BWP includes one or more random access channel resources for a two-step random access procedure and one or more random access channel resources for a four-step random access procedure and initiating the two-step random access procedure for the BWP based on a criterion, where the transmitting of the message may be based on initiating the two-step random access procedure.

Some examples of the method, apparatuses, and non-transitory computer-readable medium described herein may further include operations, features, means, or instructions for determining whether one or more conditions associated with a communication link between the UE and the base station over the non-terrestrial network satisfy the criterion based on identifying the BWP, where initiating the two-step random access procedure may be based on determining whether the one or more conditions satisfy the criterion.

In some examples of the method, apparatuses, and non-transitory computer-readable medium described herein, the criterion includes a reference signal received power parameter configured for the non-terrestrial network satisfying a threshold, a power class parameter associated with the UE, a type of the UE, a round-trip delay (RTD) between the UE and the base station satisfying a threshold, a delay offset parameter satisfying a threshold, a time and frequency synchronization-compensation parameter satisfying a threshold, a Global Navigation Satellite System (GNSS) capability of the UE, a type of the base station, an elevation angle of the base station, or a requested-delay parameter satisfying a threshold, or a combination thereof.

In some examples of the method, apparatuses, and non-transitory computer-readable medium described herein, the one or more resources include one or more types of uplink resources including physical random access channel (PRACH) resources or physical uplink shared channel (PUSCH) resources for the random access procedure, an SR, or a configured grant, or a combination thereof.

In some examples of the method, apparatuses, and non-transitory computer-readable medium described herein, the information for transmitting to the base station includes a random access request and transmitting the message includes transmitting a random access request message over the one or more resources allocated for the information, where the information includes a random access preamble and an uplink payload.

Some examples of the method, apparatuses, and non-transitory computer-readable medium described herein may further include operations, features, means, or instructions for monitoring a response window based on transmitting the random access request message and receiving, from the base station of the non-terrestrial network, a random access response message of a two-step random access procedure during the response window.

In some examples of the method, apparatuses, and non-transitory computer-readable medium described herein, the information for transmitting to the base station includes an SR, the method further including and determining whether one or more resources on a PUCCH may be configured to communicate the SR, the message including the SR, where the transmitting of the message may be based on determining whether the one or more resources on the PUCCH may be configured to communicate the SR.

Some examples of the method, apparatuses, and non-transitory computer-readable medium described herein may further include operations, features, means, or instructions for selecting to use a two-step random access procedure over the SR to establish a communication link with the base station, where the UE may be capable of using the two-step random access procedure or a four-step random access procedure, where the transmitting of the message may be based on selecting to use the two-step random access procedure.

In some examples of the method, apparatuses, and non-transitory computer-readable medium described herein, the selecting to use the two-step random access procedure may be based on a condition the UE meets to use the two-step random access procedure over the four-step random access procedure.

In some examples of the method, apparatuses, and non-transitory computer-readable medium described herein, the UE transmits the message over the one or more resources allocated for the two-step random access procedure when the one or more resources on the PUCCH may be not configured to communicate the SR or are configured but the UE is unable to send the SR.

Some examples of the method, apparatuses, and non-transitory computer-readable medium described herein may further include operations, features, means, or instructions for determining, in a first BWP, an absence of a PUCCH resource for transmitting the message including an SR and switching from the first BWP to a second BWP based on the determining of the absence of the PUCCH resource for the SR in the first BWP, where the second BWP includes the one or more resources allocated for a two-step random access procedure, where the transmitting of the message includes transmitting a BSR or uplink data, or both, over the one or more resources allocated for the two-step random access procedure.

Some examples of the method, apparatuses, and non-transitory computer-readable medium described herein may further include operations, features, means, or instructions for receiving a configuration indicating a random access channel resource and a PUCCH resource for an SR and transmitting an SR on the PUCCH resource based on selecting the random access channel resource corresponding to a four-step random access procedure or transmitting a BSR on the random access channel resource based on selecting the random access channel resource corresponding to a two-step random access procedure.

Some examples of the method, apparatuses, and non-transitory computer-readable medium described herein may further include operations, features, means, or instructions for transmitting the message includes transmitting a BSR.

Some examples of the method, apparatuses, and non-transitory computer-readable medium described herein may further include operations, features, means, or instructions for transmitting the message in a PUSCH resource for a configured grant or a two-step random access procedure.

In some examples of the method, apparatuses, and non-transitory computer-readable medium described herein, the two-step random access procedure may be contention free.

In some examples of the method, apparatuses, and non-transitory computer-readable medium described herein, resources associated with the configured grant correspond to a first priority for communicating the information and one or more resources of the two-step random access procedure corresponds to a second priority for communicating the information different than the first priority.

DETAILED DESCRIPTION

Figure 1:
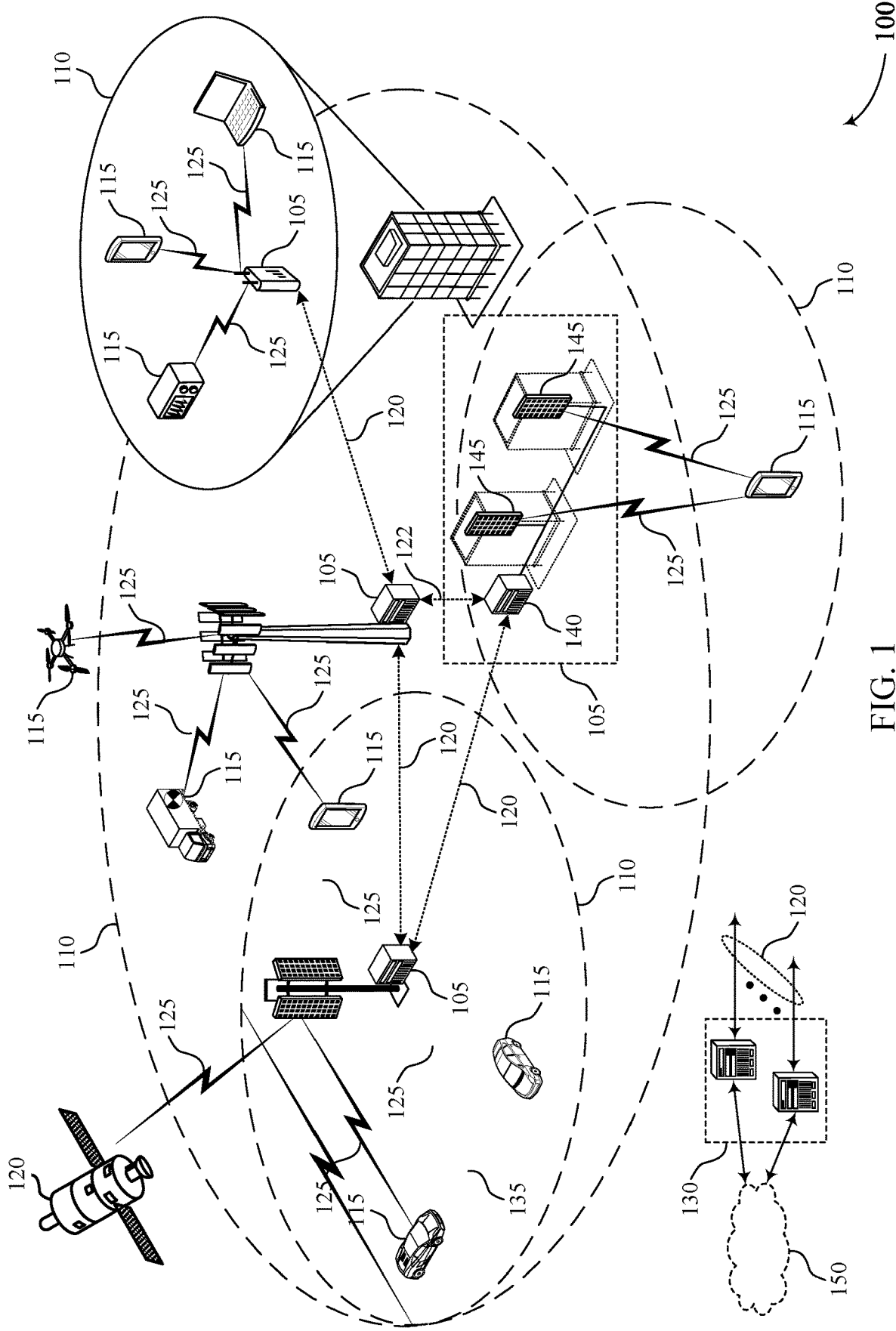
FIGS. 1 and 2 illustrate example of wireless communications systems that support resource selection associated with two-step random access procedures in accordance with aspects of the present disclosure.

A wireless communications system may include various communication devices such as a UE and a base station, which may provide wireless communication services to the UE. The wireless communications system, in some examples, may be a terrestrial network, which may support multiple radio access technologies including 4G systems, such as 4G LTE, as well as 5G systems, which may be referred to as 5G NR. Additionally or alternatively, the wireless communications system may be a non-terrestrial network, for example, a low-earth orbit (LEO) wireless communications system, a geosynchronous equatorial orbit (GEO) wireless communications system, among other examples. In the wireless communications systems, the communications devices (e.g., a UE, a base station) may support one or more multiple random access procedures, such as a two-step RACH procedure or a four-step RACH procedure. These random access procedures may also be contention-based or contention-free as described herein.

The wireless communication system may be a terrestrial network or a non-terrestrial network, or a combination thereof. A non-terrestrial network may provide coverage by using high-altitude devices (e.g., satellites) between a UE and a base station (also referred to as access stations, access gateways, non-terrestrial base stations). In some examples, the base station may consist of a control unit (CU) (e.g., gNB-CU) and a distributed unit (DU) (e.g., a gNB-DU). The gNB-CU may be non-terrestrial, while the gNB-DU may be terrestrial (e.g., located on the ground). As such, there may be latency between the gNB-DU and the gNB-CU. In the wireless communications system, a base station (e.g., a gNB-CU) may, for example, transmit messages (e.g., random access messages associated with a RACH procedure) to a non-terrestrial base station (e.g., a gNB-DU) in the non-terrestrial network which may then be relayed to the UE or vice-versa.

A UE may perform a random access procedure with a base station to gain access to communication services in the wireless communications system (e.g. a terrestrial network or a non-terrestrial network, or a combination thereof). In some cases, a UE may select between a two-step RACH procedure and a four-step RACH procedure based on channel measurements. For example, a UE may receive, from a base station, one or multiple reference signals (e.g., demodulation reference signals (DMRS), channel state information reference signals (CSI-RS), etc.) and measure these reference signals to determine a reference signal received power (RSRP). The UE may determine a path loss, for example, in a downlink or an uplink, or both, in the wireless communications system based on the RSRP. The UE may select to perform the two-step RACH procedure over the four-step RACH procedure based on the path loss and the RSRP. For example, if a BWP selected for random access is configured with both two-step and four-step random access (RA) type random access resources and the RSRP satisfies a threshold (e.g., an RSRP of a downlink path loss is above an RSRP threshold).

A terrestrial base station (e.g., a gNB-CU) and a non-terrestrial base station (e.g., a gNB-DU) may be thousands of kilometers apart and it may take some time for electromagnetic waves to propagate over the distance between the terrestrial base station (e.g., gNB-CU) and the non-terrestrial base station (e.g., a gNB-DU) and the UE. The propagation delay for non-terrestrial networks may be many orders of magnitude larger than the propagation delay for terrestrial networks. As such, a round trip delay (RTD) associated with a transmission may also be orders of magnitude larger for non-terrestrial networks than for terrestrial networks. Due to the high mobility of non-terrestrial base stations (e.g., high-altitude vehicles such as non-geostationary satellites), communications with the non-geostationary satellites may promote large and time-varying RTDs, path loss, etc. These variations may impact the reliability and the latency of wireless communications (e.g., random access operations associated with a RACH procedure) in the non-terrestrial network.

In some cases, an RSRP may be insufficient to use by a UE for selecting between a two-step RACH procedure and a four-step RACH procedure. As such, the UE may evaluate other factors to determine whether to select a two-step RACH procedure or a four-step RACH procedure to improve a probability of successful reception of a random access message of a random access procedure (e.g., a message A (msgA) of a two-step RACH procedure). That is, reception of random access messages of a random access procedure might not dependent just on an RSRP because an RSRP of far and near UEs may not vary much in non-terrestrial networks. Thus, successful reception of random access messages of a random access procedure depends on additional factors such as a transmit power of the UE.

As demand for communication efficiency increases for wireless communications, the wireless communications system, such as a non-terrestrial network, may support higher reliability or lower latency random access operations, among other examples. For example, a UE may select a two-step RACH procedure over a four-step RACH procedure based on an RTD. For example, the larger the RTD, the higher the priority is for the UE to select the two-step RACH procedure to cut the propagation delay. In some examples, using the two-step RACH procedure over the four-step RACH procedure may depend on the UE latency requirements. For example, the more delay sensitivity an application is the greater priority for the UE to use the two-step RACH procedure over the four-step RACH procedure.

Various aspects of the described techniques relate to configuring a UE, to select resources (e.g., random access resources) for a random access procedure in a non-terrestrial network. The UE may be configured to perform a random access procedure over a specified BWP, which may be configured for one or multiple random access procedures. For example, a BWP may be configured for a two-step RACH procedure or a four-step RACH procedure, or both. When a BWP is configured to support multiple random access procedures (e.g., a two-step RACH procedure and a four-step RACH procedure), the UE may be configured to select a type for the resources (e.g., random access resources) for the random access procedure the UE selects to perform over the BWP. That is, if a BWP for a random access procedure is configured with both types of random access procedures (e.g., two-step RACH and four-step RACH), the UE may set the type to two-step RACH based on one or more factors as described herein. Additionally or alternatively, a base station may configure a single type of resource for the UE to use for an SR.

For example, the UE may be configured to use random access resources (e.g., associated with a two-step RACH procedure) or uplink resources (e.g., PUCCH resources) to communicate the SR. Alternatively, the base station may configure both resources for the SR. The UE may use the SR to request uplink resources in the non-terrestrial network. As described herein, the UE may be further configured to select between random access resources (e.g., associated with a two-step RACH procedure) and uplink resource (e.g., PUCCH resources) for transmitting an SR. Additionally or alternatively, the UE may be configured to select between a contention free random access procedure (e.g., a contention free two-step RACH procedure) or a configured grant (also referred to as a semi-persistent grant) to address challenges (e.g., larger propagation delays, etc.) in a non-terrestrial network. The described techniques may thus provide improvements to power consumption and, in some examples, may promote higher reliability and lower latency random access operations in a non-terrestrial network, among other benefits.

Aspects of the disclosure are initially described in the context of wireless communications systems. Aspects of the disclosure are further illustrated by and described with reference to apparatus diagrams, system diagrams, and flowcharts that relate to resource selection associated with two-step random access procedures.

FIG. 1 illustrates an example of a wireless communications system 100 that supports resource selection associated with two-step random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 122 (e.g., via an S1, N2, N3, or other interface). The base stations 105 may communicate with one another over the backhaul links 122 (e.g., via an X2, Xn, or other interface) either directly (e.g., directly between base stations 105), or indirectly (e.g., via core network 130), or both. In some examples, the backhaul links 122 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may perform a random access procedure (e.g., a RACH procedure) with a UE 115. For example, a base station 105 and a UE 115 may perform a RACH procedure to establish a connection. In other examples, a base station 105 and a UE 115 may perform a RACH procedure to re-establish a connection after connection failure (e.g., a radio-link failure) with the base station 105, or to establish a connection for handover to another base station 105, or the like. As part of the RACH procedure, a UE 115 may transmit a random access preamble. This may enable the base station 105 to distinguish between multiple UEs 115 attempting to access the wireless communications system 100 simultaneously. The base station 105 may respond with a random access response that provides an uplink resource grant, a timing advance, and a temporary cell radio network temporary identifier (C-RNTI).

The UE 115 may transmit an RRC connection request along with a temporary mobile subscriber identity (TMSI), for example, if the UE 115 has previously been connected to the same wireless network) or a random identifier. The RRC connection request may also indicate the reason the UE 115 is attempting to connect to the network (e.g., an emergency, a signaling, a data exchange, etc.). The base station 105 may respond to the connection request with a contention resolution message addressed to the UE 115, which may provide a new C-RNTI. If the UE 115 receives a contention resolution message with the correct identification, it may proceed with an RRC connection setup. If the UE 115 does not, however, receive a contention resolution message (e.g., if there is a conflict with another UE 115) it may repeat the RACH procedure by transmitting a new random access preamble. Such exchange of messages between the UE 115 and base station 105 for random access may be referred to as a four-step RACH procedure.

Alternatively, a two-step RACH procedure may be performed for random access. For example, a UE 115 may participate in a two-step RACH procedure to reduce delay in establishing communication with a base station 105 (e.g., as compared to a four-step RACH procedure). In some examples, the two-step RACH procedure may operate regardless of whether a UE 115 has a valid timing advance. For example, a UE 115 may use a valid timing advance to coordinate the timing of its transmissions to a base station 105 (e.g., to account for propagation delay) and may receive the valid timing advance as part of the two-step RACH procedure. Additionally, the two-step RACH procedure may be applicable to any cell size, may work regardless of whether the RACH procedure is contention-based or contention-free, and may combine multiple random access messages from a four-step RACH procedure. For example, a random access request message (e.g., a msgA), sent from a UE 115 to a base station 105, may combine the contents of a random access message 1 (msg1) and a random access message 3 (msg3) from the four-step RACH procedure. Additionally, the random access request message (e.g., msgA) may consist of a random access preamble and a random access payload including the contents equivalent to msg3.

The UE 115 may transmit the random access message A (msgA) of the two-step RACH procedure including the preamble on a physical random access channel (PRACH) and the payload on a physical uplink shared channel (PUSCH). In some cases, a minimum payload size of the msgA may be 56 bits or 72 bits. After transmitting the msgA, the UE 115 may monitor for a random access response message (e.g., a random access message B (msgB)) from the base station 105 within a configured window (also referred to as a response window). The base station 105 may transmit a downlink control channel (e.g., a physical downlink control channel (PDCCH)) and a corresponding the msgB to the UE 115. The msgB may combine the equivalent contents of a random access message 2 (msg2) and a random access message 4 (msg4) from the four-step RACH procedure.

For a contention-free random access procedure, upon receiving the msgB from the base station 105, the UE 115 may terminate (e.g., abort) the RACH procedure. In some examples, if the UE 115 received the PDCCH with the C-RNTI, the UE 115 may transmit feedback information (e.g., a HARQ feedback) to the base station 105. Alternatively, for a contention-based random access procedure, the base station 105 may perform an early contention resolution operation. If the contention resolution is successful, upon receiving the msgB from the base station 105, the UE 115 may terminate (e.g., abort) the RACH procedure.

The wireless communications system 100 may be a terrestrial network or a non-terrestrial network, or a combination thereof. A non-terrestrial network may provide coverage by using high-altitude devices (e.g., a satellite 120) between the UE 115 and the base stations 105 (also referred to as access stations, access gateways, non-terrestrial base stations). In some examples, the base station 105 may consist of a CU (e.g., a gNB-CU) and a DU (e.g., a gNB-DU). The gNB-CU may be non-terrestrial, while the gNB-DU may be terrestrial (e.g., located on the ground). As such, there may be latency between the gNB-DU and the gNB-CU. In the wireless communications system 100, a base station 105 (e.g., a gNB-CU) may, for example, transmit messages (e.g., random access messages associated with a RACH procedure) to a non-terrestrial base station 105 (e.g., a gNB-DU) in the non-terrestrial network which may then be relayed to the UE 115 or vice-versa.

A terrestrial base station 105 (e.g., a gNB-CU) and a non-terrestrial base station 105 (e.g., a gNB-DU) may be thousands of kilometers apart and it may take some time for electromagnetic waves to propagate over the distance between the terrestrial base station 105 (e.g., gNB-CU) and the non-terrestrial base station 105 (e.g., a gNB-DU) and the UE 115. The propagation delay for non-terrestrial networks may be many orders of magnitude larger than the propagation delay for terrestrial networks. As such, an RTD associated with a transmission may also be orders of magnitude larger for non-terrestrial networks than for terrestrial networks. Due to the high mobility of non-terrestrial base stations (e.g., high-altitude vehicles such as non-geostationary satellites), communications with the non-geostationary satellites may promote large and time-varying RTDs, path-loss, etc. These variations may impact the reliability and the latency of random access messaging associated with a RACH procedure in the non-terrestrial networks.

In the example of a non-terrestrial network, a UE 115 may select between a two-step RACH procedure and a 4-step RACH procedure. A UE 115 may select resources for a random access procedure in a non-terrestrial network. The UE 115 may perform a random access procedure over a BWP, which may be configured for one or multiple random access procedures. For example, a BWP may be configured for a two-step RACH procedure or a four-step RACH procedure, or both. When a BWP is configured to support multiple random access procedures, the UE 115 may select a type of the resources (e.g., two-step random access resources, four-step random access resources) for the random access procedure that the UE 115 selects to perform over the BWP.

Additionally or alternatively, a base station 105 may configure a type of resource for a UE 115 to use for a SR following the random access procedure or as part of the random access procedure. For example, the UE 115 may be configured to use random access resources (e.g., associated with a two-step RACH procedure) or uplink resources (e.g., PUCCH resources) for the SR. Alternatively, the base station 105 may configure both resources for the SR. The UE 115 may use the SR to request uplink resources (e.g., UL-SCH resources) for uplink transmissions or sidelink transmission in the wireless communications system 100.

A UE 115 may select between random access resources (e.g., associated with a two-step RACH procedure) and uplink resource (e.g., PUCCH resources) for transmitting an SR. Additionally or alternatively, the UE 115 may select between a contention free random access procedure (e.g., a contention free two-step RACH procedure) or a configured grant (also referred to as a semi-persistent grant) to address challenges (e.g., larger propagation delays, etc.) in a non-terrestrial network. For example, uplink information may be communicated using resources for a two-step RACH procedure or resources of a configured grant. The wireless communications system 100 may thus provide improvements to power consumption and, in some examples, may promote higher reliability and lower latency random access operations in a non-terrestrial network, among other benefits. In some cases (such as in a non-terrestrial network with a large propagation delay), the periodicity of a configured grant may be larger than a periodicity of a two-step random access procedure. In some cases, PUSCH resources for a two-step RACH procedure (e.g., contention-free) and a configured grant are configured as logical channel specific. In such cases, a restriction associated with logical channels may be applied. For example, uplink data in a first logical channel may be allowed to use resources allocated for msgA of a two-step RACH procedure to communicate uplink data, but may not be allowed to use configured grant PUSCH resources. In some cases, UE may be allowed to send a BSR over whichever PUSCH resource is earlier. In some cases, this can be configured as an indicator (for example, BSR=0 for the logical channel allowed to use configured grant) for the network whether to deactivate or release configured grant or the two-step RACH for the UE. In some cases, the UE uses a priority scheme to select between using resources for a two-step RACH procedure or resources of a configured grant. In some examples, the resources for the two-step RACH procedure may have a higher priority than the resources of the configured grant. In some examples, the resources of the configured grant may have a higher priority than the resources for the two-step RACH procedure.

Figure 2:
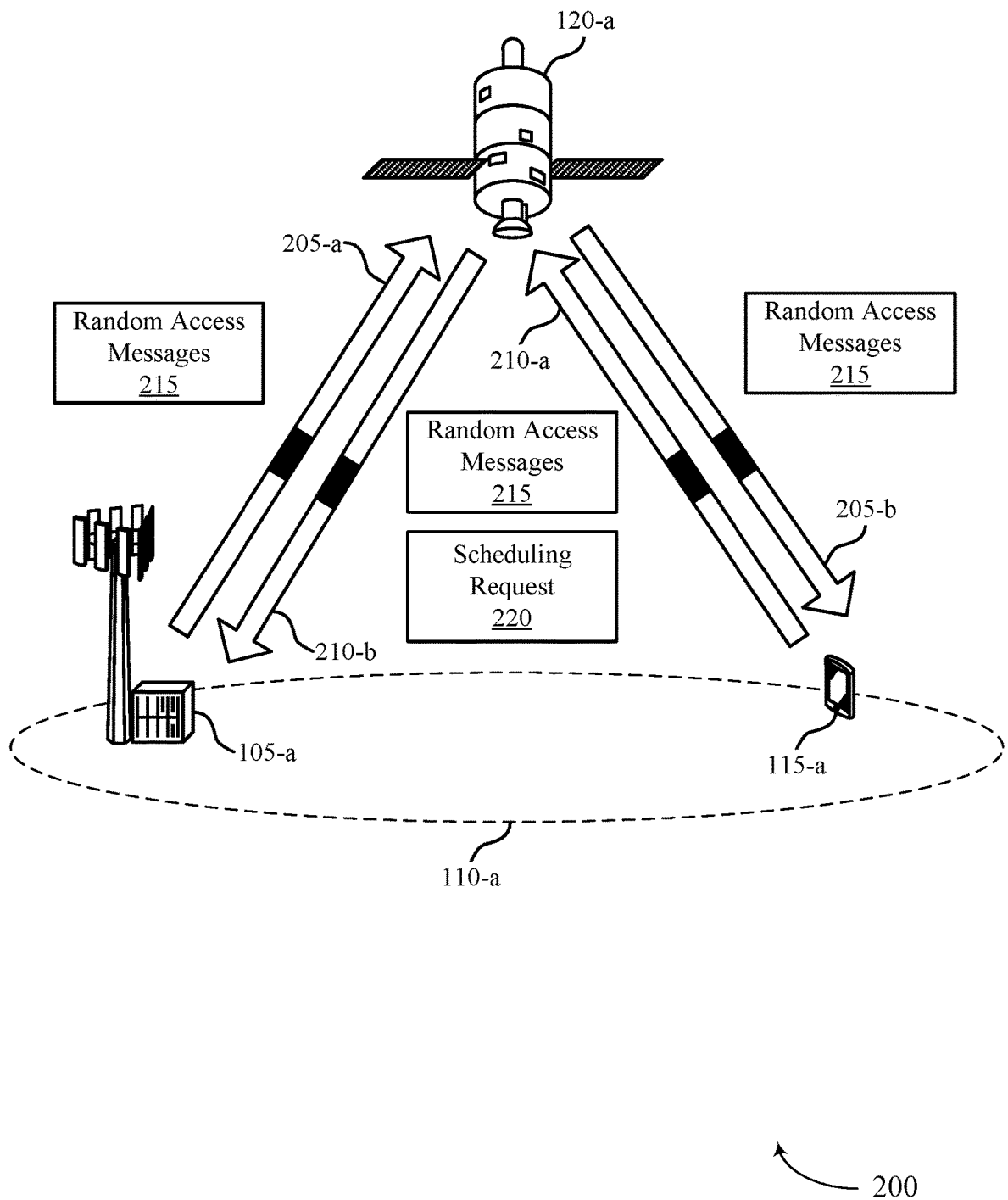

FIG. 2 illustrates an example of a wireless communications system 200 that supports resource selection associated with two-step random access procedures in accordance with aspects of the present disclosure. In some examples, the wireless communications system 200 may implement aspects of the wireless communications system 100 or may be implemented by aspects of the wireless communications system 100. The wireless communications system 200 may be an example of a terrestrial network or a non-terrestrial network, or a combination thereof. For example, the wireless communications system 200 may include a base station 105-*a*, a UE 115-*a*, and a satellite 120-*a*, which may be examples of a base station 105, a UE 115, and a satellite 120 as described with reference to FIG. 1. In some examples, the base station 105-*a* may consist of a CU (e.g., a gNB-CU) and a DU (e.g., a gNB-DU), which may be the satellite 120-*a*. As such, the gNB-CU may be non-terrestrial, while the gNB-DU may be terrestrial.

The wireless communications system 200 may provide a geographic coverage area 110-*a* by using the satellite 120-*a* between the base station 105-*a* and the UE 115-*a*. The base station 105-*a* may therefore serve a geographic coverage area 110-*a* with assistance of or through the satellite 120-*a*. In some examples, the base station 105-*a* may not have its own ground geographic coverage area. For example, the base station 105-*a* may communicate to the satellite 120-*a* without directly communicating to any ground user terminals, such as, for example, the UE 115-*a*. In some examples, a ground base station (e.g., the base station 105-*a*) may be a gateway (e.g., in this case, the satellite 120-*a* can itself function as a base station (i.e., can perform scheduling, radio link control, etc.)).

A non-terrestrial network may be absent of ground base stations that directly communicate with user terminals without relaying communications through satellites. In some other examples, a non-terrestrial network may be formed of satellites and be absent of any ground base stations. In some examples, the satellite 120-*a* may relay communications between the base station 105-*a* and the UE 115-*a*. For example, the base station 105-*a* may communicate with the UE 115-*a* via the satellite 120-*a* or vice-versa. In some examples, for communications originating at the base station 105-*a* and going to the UE 115-*a*, the base station 105-*a* may transmit a transmission 205-*a* to the satellite 120-*a*. The satellite 120-*a* may relay the transmission 205-*a* as a transmission 205-*b* to the UE 115-*a*. In other examples, for communications originating at the UE 115-*a* and going to the base station 105-*a*, the UE 115-*a* may transmit a transmission 210-*a* to the satellite 120-*a*. The satellite 120-*a* may relay the transmission 210-*a* as a transmission 210-*b* to base station 105-*b*.

One or more of the base station 105-*a*, the UE 115-*a*, and the satellite 120-*a* may perform a random access procedure (e.g., a RACH procedure). For example, the base station 105-*a* (or the satellite 120-*a*) and the UE 115-*a* may perform a RACH procedure to establish a connection. In other examples, the base station 105-*a* (or the satellite 120-*a*) and the UE 115-*a* may perform a RACH procedure to re-establish a connection after a connection failure (e.g., a radio-link failure) with the base station 105-*a* (or the satellite 120-*a*), or to establish a connection for handover to another base station, or the like. The base station 105-*a* (or the satellite 120-*a*) and the UE 115-*a* may also support multiple radio access technologies including 4G systems and 5G systems.

A RACH procedure between the base station 105-*a* (or the satellite 120-*a*) and the UE 115-*a* may correspond to, for example, at least one of the above example radio access technologies. By way of example, a RACH procedure may be related to 4G systems and may be referred to as a four-step RACH procedure. As part of the four-step RACH procedure, the base station 105-a (or the satellite 120-a) and the UE 115-a may transmit one or more messages (e.g., handshake messages), such as random access messages 215. The random access messages 215 may include a msg1, a msg2, a msg3, and a msg4 as described herein.

The UE 115-a may transmit a msg1, which may include a preamble that may carry information, such as a UE identifier. The purpose of the preamble transmission may be to provide an indication to the base station 105-a (or the satellite 120-a) presence of a random access attempt, and to allow the base station 105-a (or the satellite 120-a) to determine a delay (e.g., a timing delay) between the base station 105-a (or the satellite 120-a) and the UE 115-a. The UE 115-a may transmit the msg1 to the base station 105-a (or the satellite 120-a) on a PRACH, for example.

The preamble of the msg1 may, in some examples, be defined by a preamble sequence and a cyclic prefix. A preamble sequence may be defined based in part on a Zadoff-Chu sequence. The UE 115-a may use a guard period to handle timing uncertainty of the msg1 transmission. For example, before beginning the RACH procedure, the UE 115-a may obtain downlink synchronization with the base station 105-a (or the satellite 120-a) based in part on a cell-search procedure. However, because the UE 115-a has not yet obtained uplink synchronization with the base station 105-a (or the satellite 120-a), there may be an uncertainty in uplink timing due to the location of the UE 115-a in the cell (e.g., a geographic coverage area of base station 105-a (or the satellite 120-a)) not being known. Therefore, including a cyclic prefix to the msg 1 may be beneficial, in some examples, for handling the uncertainty in uplink timing.

In some examples, there may be a number of preamble sequences (e.g., 64 preamble sequences) per cell (e.g. coverage area). The UE 115-a may select a preamble sequence from a set of sequences in a cell (e.g., geographic coverage area of the base station 105-a (or the satellite 120-a)) based in part on a randomness selection. In some examples, the UE 115-a may select a preamble sequence based in part on an amount of traffic that the UE 115-a has for transmission on an uplink shared channel (UL-SCH). From the preamble sequence that the UE 115-a selected, the base station 105-a (or the satellite 120-a) may determine the amount of uplink resources to be granted to the UE 115-a.

Some examples of a random access procedure may be contention-based or contention-free as described herein. When performing a contention-based random access procedure, the UE 115-a may select a preamble sequence from a set of sequences. That is, as long as other UEs are not performing a random access attempt using the same sequence at a same temporal instance, no collisions will occur, and the random access attempt may be detected by the base station 105-a (or the satellite 120-a). If the UE 115-a is performing a contention-free random access attempt, for example, for a handover to a new cell, the preamble sequence to use may be explicitly signaled (e.g., in control information) by the base station 105-a (or the satellite 120-a). To avoid collisions or interference, the base station 105-a (or the satellite 120-a) may select a contention-free preamble sequence from sequences not associated with the contention-based random access attempt.

Upon receiving the msg 1, the base station 105-a (or the satellite 120-a) may respond appropriately with a msg 2. For example, the base station 105-a (or the satellite 120-a) may transmit the msg2 to the UE 115-a on a downlink shared channel (DL-SCH) or a PDCCH. In some examples, the msg2 may have a same or a different configuration (format) compared to the msg1. The msg2 may carry information for the UE 115-a, where the information is determined by the base station 105-a (or the satellite 120-a) based in part on information carried in the msg1. For example, the information in the msg2 may include an index of a preamble sequence detected and for which the response is valid, a timing advance determined based in part on the preamble sequence detected, a scheduling grant indicating time and frequency resources for the UE 115-a to use for transmission of a next random access message transmission (e.g., a msg3) by the UE 115-a, or a network identifier (e.g., RA-RNTI) for further communication with the UE 115-a, or the like.

The msg2 may be scheduled on a PDCCH using an identity reserved for random access messaging, for example, an RA-RNTI. The UE 115-a may monitor the PDCCH to detect and receive the msg2. In some examples, the UE 115-a may monitor the PDCCH for a random access message transmission from the base station 105-a (or the satellite 120-a) during a random access response window, which may be fixed or variable in size as described herein. For example, if the UE 115-a does not detect and receive the msg2 transmission from the base station 105-a (or the satellite 120-a), the random access attempt may be declared as a failure and the four-step RACH procedure may repeat. However, in the subsequent attempt, the random access response window may be adjusted (e.g., increased or decreased in duration) as described herein.

Once the UE 115-a successfully receives the msg2, the UE 115-a may obtain uplink synchronization with the base station 105-a (or the satellite 120-a). In some examples, before data transmission from the UE 115-a, a unique identifier within the cell (e.g., a C-RNTI) may be assigned to the UE 115-a. In some examples, the UE 115-a may transmit additional messages (e.g., a connection request message) for setting up the connection between the base station 105-a (or the satellite 120-a) and the UE 115-a. The UE 115-a may transmit any necessary messages, for example, a msg3 to the base station 105-a (or the satellite 120-a) using the UL-SCH resources (or PUSCH resources) assigned in the msg2. The msg2 may include a UE identifier for contention resolution.

The base station 105-a (or the satellite 120-a) may receive the msg3 and may respond properly, for example, by transmitting a msg4, which may be a contention resolution message. When multiple UEs (including UE 115-a) are performing simultaneously random access attempts using a same preamble sequence, these UEs may result in listening for a same response message (e.g., the msg4). Each UE (including UE 115-a) may receive the msg4 and compare an identifier (e.g., network identifier) in the msg4 to the identifier specified in the msg3. When the identifiers match, the corresponding UE (e.g., UE 115-a) may declare the RACH procedure successful. UEs that do not identify a match between the identifiers are considered to have failed the RACH procedure and may repeat the four-step RACH procedure with the base station 105-a (or the satellite 120-a). As a result of the four-step RACH procedure, the base station 105-a (or the satellite 120-a) and the UE 115-a may establish a connection.

The four-step RACH procedure may be effective for facilitating random access for the UE 115-a, however, there may be unnecessary latencies associated with this procedure. For example, latencies related to contention-based protocol of random access messaging may exhaust additional resources of the UE 115-a. The UE 115-a may therefore support a two-step RACH procedure with the base station 105-a (or the satellite 120-a). As part of a two-step RACH procedure, to decrease latencies related to contention-based aspects of the two-step RACH procedure, the base station 105-a (or the satellite 120-a) and the UE 115-a may exchange fewer messages (e.g., handshake messages) compared to the four-step RACH procedure.

In the example of a two-step RACH procedure, the random access messages 215 may include a msgA (also referred to as a random access request message) and a msgB (also referred to as a random access response message). The UE 115-a may transmit a msgA and the base station 105-a (or the satellite 120-a) may transmit a msgB in response to the msgA. The msgA may combine parts of msg1 and msg3 of the four-step RACH procedure, while the msgB may combine aspects of msg2 and msg4 of the four-step RACH procedure. After successfully receiving the msgA, the base station 105-b (or the satellite 120-a) may construct and transmit the msgB to the UE 115-a. For example, the base station 105-a (or the satellite 120-a) may transmit the msgB to the UE 115-a on a DL-SCH, PDSCH, PDCCH. The msgB may include at least one of a network identifier of the UE 115-a, a timing advance, and a backoff indication for the UE 115-a. Once the UE 115-a receives the msgB, the UE 115-a may handle the connection procedure (e.g., 2-step RACH procedure or 4-step RACH procedure) appropriately.

In some cases, the base station 105-a and the satellite 120-a may be thousands of kilometers apart and it may take some time for transmissions to propagate over the distance between the base station 105-a and the satellite 120-a and between the satellite 120-a and the UE 115-a. The propagation delay for non-terrestrial networks may be many orders of magnitude larger than the propagation delay for terrestrial networks. As such, the RTD associated with a transmission may also be orders of magnitude larger for non-terrestrial networks than for terrestrial networks. In addition, high speeds of non-geostationary satellites, for example, such as the satellite 120-a may promote variation in RTD. As a result, the UE 115-a may experience challenges with the exchange of the random access messages (e.g., msg1, msg2, msg3, msg4, msgA, and msgB) from the satellite 120-a.

To address the above challenges (e.g., large propagation delays) related to RACH procedure in a non-terrestrial network, the UE 115-a may be configured to select between a two-step RACH procedure and a four-step RACH procedure. The UE 115-a may be configured to perform a random access procedure in a BWP, which may be configured for one or multiple random access procedures. For example, a BWP may be configured for a two-step RACH procedure or a four-step RACH procedure, or both. When a BWP is configured to support multiple random access procedures (e.g., a two-step RACH procedure and a four-step RACH procedure), the UE 115-a may be configured to select a type of the resources (e.g., random access resources) for the random access procedure the UE 115 selects to perform in the BWP. That is, if a BWP for a random access procedure is configured with both types of random access procedures (e.g., two-step RACH and four-step RACH), the UE 115-a may set the type to two-step RACH based on a criterion or a criteria (e.g., one or more factors), as described below. That is, the UE 115-a may be configured to select between a two-step RACH procedure over a four-step RACH procedure.

The UE 115-a may select and perform a two-step RACH procedure or a four-step RACH procedure based on an RSRP threshold. For example, the UE 115-a may determine an RSRP by measuring one or more reference signals from the base station 105-a (or the satellite 120-a). The UE 115-a may determine that the RSRP satisfies a threshold (e.g., an RSRP threshold). As a result, the UE 115-a may select and perform the two-step RACH procedure. Otherwise, if the RSRP does not satisfy a threshold, the UE 115-a may select and perform the four-step RACH procedure. The threshold may be a default threshold configured for both terrestrial networks and non-terrestrial networks. Alternatively, the threshold may be specific for non-terrestrial networks.

The UE 115-a may be configured with a power class, which may define a maximum transmit power level for any transmission in a BWP. In some examples, the UE 115-a may select and perform a two-step RACH procedure or a four-step RACH procedure based on the power class. For example, if a power class supports a transmit power level for a two-step RACH procedure in a specified BWP, the UE 115-a may select and perform the two-step RACH procedure. Otherwise, the UE 115-a may perform the four-step RACH procedure. In other examples, the UE 115-a may select and perform the two-step RACH procedure or the four-step RACH procedure based on a UE type. For example, if the UE 115-a is a very small aperture terminal (VSAT) or a handled device, among other examples, the UE 115-a may select and perform the two-step RACH procedure over the four-step RACH procedure.

Additionally or alternatively, the UE 115-a may select and perform a two-step RACH procedure or a four-step RACH procedure based on an RTD, which may be estimated by the UE 115-a using position information. For example, the UE 115-a may receive an ephemeris from the base station 105-a (or the satellite 120-a). The ephemeris may be a data structure, for example, a table or file indicating positions of a celestial objects (e.g., the satellite 120-a). The UE 115-a may thereby estimate an RTD based on position information of the satellite 120-a, and determine to perform the two-step RACH procedure based on the estimated RTD. Otherwise, the UE 115-a may select and perform the four-step RACH procedure based on the estimated RTD.

In some examples, the UE 115-a may select a two-step RACH procedure or a four-step RACH procedure based on a delay offset broadcasted by the network (e.g., representing the RTD between the satellite 120-a and the base station 105-a). The UE 115-a may, in some other examples, determine to select a two-step RACH procedure over a four-step RACH procedure based on time and frequency synchronization or compensation accuracy of the UE 115-a. In other examples, the UE 115-a may select a two-step RACH procedure or a four-step RACH procedure based on a global navigation satellite system (GNSS) capability of the UE 115-a. The UE 115-a may select and perform a two-step RACH procedure or a four-step RACH procedure based on a type of the satellite 120-a, which may be a LEO satellite or a GEO satellite. For example, the UE 115-a may select and perform a two-step RACH procedure when the satellite 120-a is a LEO satellite. Otherwise, the UE 115-a may select and perform a four-step RACH procedure. Alternatively, the UE 115-a may select and perform a two-step RACH procedure when the satellite 120-a is a GEO satellite. Otherwise, the UE 115-a may select and perform a four-step RACH procedure.

In some examples, the UE 115-a may select and perform a two-step RACH procedure over a four-step RACH procedure based on an elevation angle of the satellite 120-a. For example, the UE 115-a may select and perform a two-step RACH procedure based on an elevation angle of the satellite 120-*a* satisfying a threshold. Otherwise, the UE 115-*a* may select and perform a four-step RACH procedure. In some other examples, the UE 115-*a* may select and perform a two-step RACH procedure based on a delay requirement of an application (e.g., a contention free application, contention-based application). For example, for contention free random access, the UE 115-*a* may select and perform a two-step RACH procedure. Otherwise, for contention-based random access the UE 115-*a* may select and perform a four-step RACH procedure. Additionally or alternatively, the UE 115-*a* may select between a two-step RACH procedure and a four-step RACH procedure based on a timing advance, a logical channel, a location of the UE 115-*a* in the wireless communications system 200, a distance between the UE 115-*a* and the satellite 120-*a*, a quality-of-service (QoS), or an intra-satellite, or a combination thereof. The UE 115-*a* may thus promote higher reliability and lower latency random access operations in a non-terrestrial network, among other benefits, by selecting to perform a two-step RACH procedure or a four-step RACH procedure based on one or more of the above criteria.

In the wireless communications system 200, the UE 115-*a* may select between a random access resource (e.g., a RACH resource) and an uplink resource (e.g., a PUCCH resource) for SR transmission (e.g., an SR 220). In some examples, the base station 105-*a* (or the satellite 120-*a*) may configure a type of resource for the UE 115-*a* to use for an SR (e.g., an SR 220) following the random access procedure or as part of the random access procedure. In some examples, the base station 105-*a* (or the satellite 120-*a*) may configure a single resource (i.e., either two-step RACH or PUCCH resource for SR). For example, the UE 115-*a* may be configured to use random access resources (e.g., associated with a two-step RACH procedure) or uplink resources (e.g., PUCCH resources) for the SR 220. In some examples, if a PUCCH resource for the SR 220 is not configured in a BWP (e.g., an active BWP), the UE 115-*a* may switch to another BWP where the two-step RACH is configured.

Alternatively, the base station 105-*a* (or the satellite 120-*a*) may configure both two-step RACH and PUCCH resource for the SR 220. In some examples, when the SR 220 is triggered, priority may be configured to the UE 115-*a* to use the PUCCH resource for the SR 220. That is, the UE 115-*a* may be configured to use a PUCCH resource for the SR 220 over a random access resource (e.g., a PRACH resource) when both the PUCCH resource and the random access resource are configured (e.g., available) for an active BWP. In some other examples, the UE 115-*a* may select to transmit the SR 220 on a PUCCH resource or a random access resource (e.g., a PRACH resource) based on a selection criteria for the 2-step RACH procedure and the four-step RACH procedure. For example, if the UE 115-*a* meets the criteria to select the two-step RACH procedure, the UE 115-*a* may select the random access resource associated with the two-step RACH for the SR 220. Otherwise, the UE 115-*a* selects the PUCCH resource for the SR 220.

In some cases, the base station 105-*a* (or the satellite 120-*a*) might not configure the UE 115-*a* with both a contention free two-step RACH and a configured grant. However, in non-terrestrial network, as the propagation delay is large, the periodicity of a configured grant can be larger than a periodicity of random access occasions (RO) of a RACH procedure. Therefore, to address the challenges of large propagation delays, etc. in the wireless communications system 200, the UE 115-*a* may be configured to select between a contention free random access procedure (e.g., a contention free two-step RACH procedure) or a configured grant (also referred to as a semi-persistent grant).

The base station 105-*a* (or the satellite 120-*a*) may configure PUSCH resources for a contention free two-step RACH procedure and a configured grant to be logical channel specific. Therefore, logical channel prioritization (LCP) restriction may be applied. For example, the UE 115-*a* may transmit uplink data on a logical channel using a two-step RACH msgA resource, but might not be allowed to use a configured grant PUSCH resource. In some examples, the UE 115-*a* may be configured to transmit a buffer status report (BSR) on a PUSCH resource associated with the two-step RACH msgA resource or the configured grant PUSCH resource whichever is earlier. This can be configured as an indicator. For example, the base station 105-*a* (or the satellite 120-*a*) may transmit an indication (e.g., BSR=0) indicating that a logical channel may use a random access resource or a configured grant resource. The network may thereby activate (or deactivate) or release a configured grant or a contention free two-step RACH procedure for the UE 115-*a*.

The base station 105-*a* (or the satellite 120-*a*) may configure the UE 115-*a* to select a random access procedure (e.g., a two-step RACH procedure, a four-step RACH procedure) or a configured grant based on a priority. In some examples, a contention free random access procedure may have a higher priority (e.g., a contention free two-step RACH procedure) compared to the configured grant. In some other examples, a contention free random access procedure (e.g., a contention free four-step RACH procedure) may have a lower priority compared to the configured grant. In other examples, a configured grant may have a higher priority compared to a contention based random access procedure (e.g., a contention base two-step RACH procedure).

Figure 3:
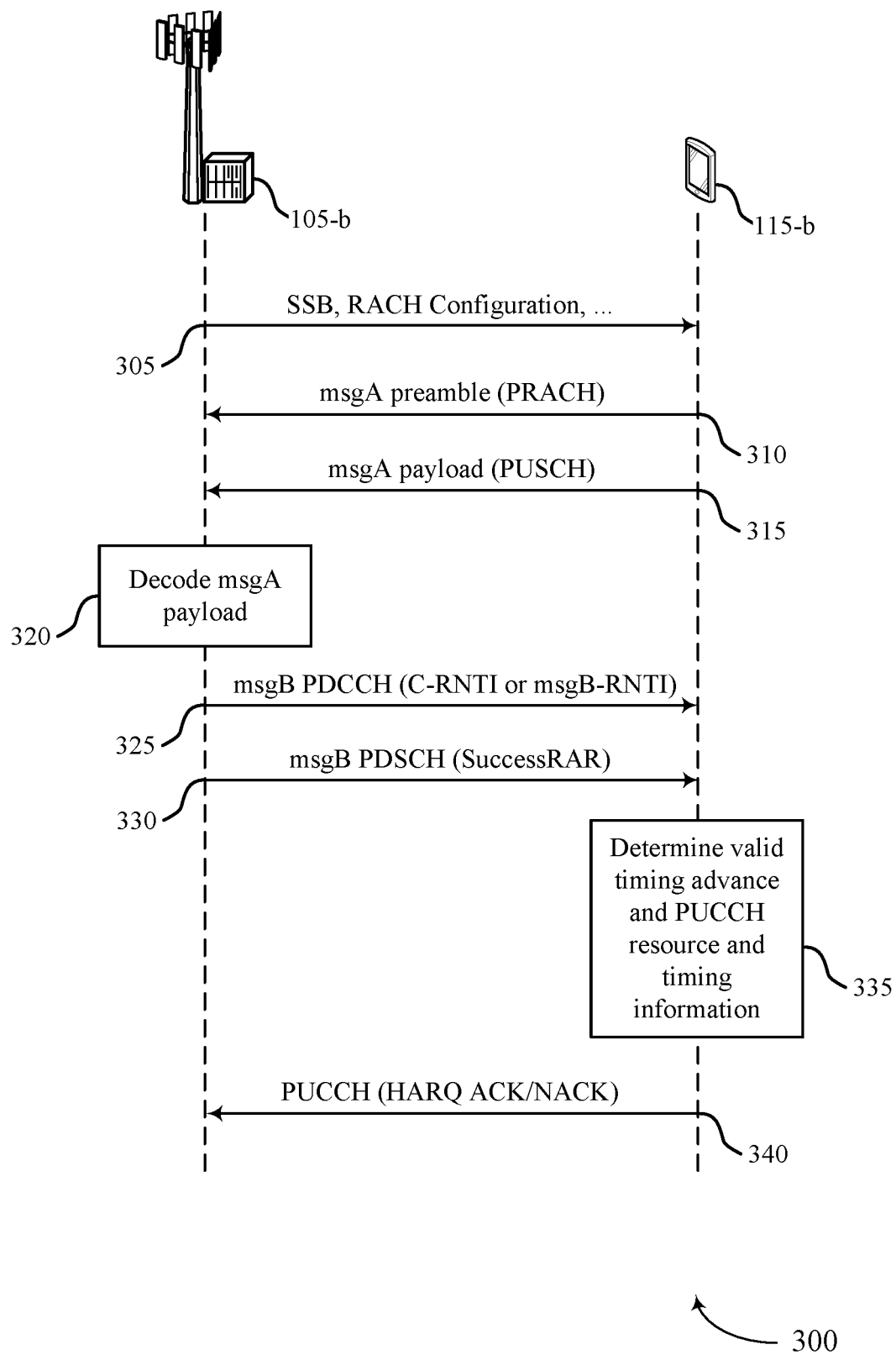
FIG. 3 illustrates an example of a process flow that supports resource selection associated with two-step random access procedures in accordance with aspects of the present disclosure.

FIG. 3 illustrates an example of a process flow 300 that supports resource selection associated with two-step random access procedures in accordance with aspects of the present disclosure. The process flow 300 may implement be implemented by aspects of the wireless communications systems 100 and 200 or may aspects of the wireless communications system 100 and 200 described with reference to FIGS. 1 and 2, respectively. For example, the process flow 300 may be based on a configuration by a base station 105-*b* or a UE 115-*b*, and implemented by the UE 115-*b*. The base station 105-*b* or the UE 115-*b* may be examples of devices, as described herein. In the following description of the process flow 300, the operations between the base station 105-*b* or the UE 115-*b* may be transmitted in a different order than the example order shown, or the operations performed by the base station 105-*b* or the UE 115-*b* may be performed in different orders or at different times. Some operations may also be omitted from the process flow 300, and other operations may be added to the process flow 300.

The base station 105-*b* and the UE 115-*b* may perform a RACH procedure, such as a two-step RACH procedure as described herein. In some examples, the UE 115-*b* may select to perform the two-step RACH procedure based on one or more factors as described herein. For example, the UE 115-*b* may select to perform the two-step RACH procedure based on a RSRP parameter configured for the non-terrestrial network satisfying a threshold, a power class parameter associated with the UE 115-*b*, a type of the UE 115-*b*, a RTD between the UE 115-*b* and the base station 105-*b* satisfying a threshold, a delay offset parameter satisfying a threshold, a time and frequency synchronization-compensation parameter satisfying a threshold, a GNSS capability of the UE 115-b, a type of the base station 105-b, an elevation angle of the base station 105-b (e.g., in non-terrestrial scenarios as described herein), or a requested-delay parameter satisfying a threshold, or a combination thereof.

At 305, the base station 105-b (e.g., a satellite) may transmit an SSB, a RACH configuration, among other information, to the UE 115-b. At 310, the UE 115-b may transmit a msgA preamble, for example, on a PRACH as described herein. At 315, the UE 115-b may transmit a msgA payload, for example, on a PUSCH as described herein. At 320, the base station 105-b may decode the msgA payload. At 325, the base station 105-b may transmit a msgB PDCCH including a C-RNTI or a msgB-RNTI. At 325, the base station 105-b may transmit a msgB physical downlink shared channel (PDSCH) including an indication of a result of the RACH procedure (e.g., a success RAR). At 335, the UE 115-b may determine valid timing advance and PUCCH resource and timing information. At 340, the UE 115-b may transmit feedback information on a PUCCH (e.g., HARQ ACK/NACK) as described herein.

Figure 4:
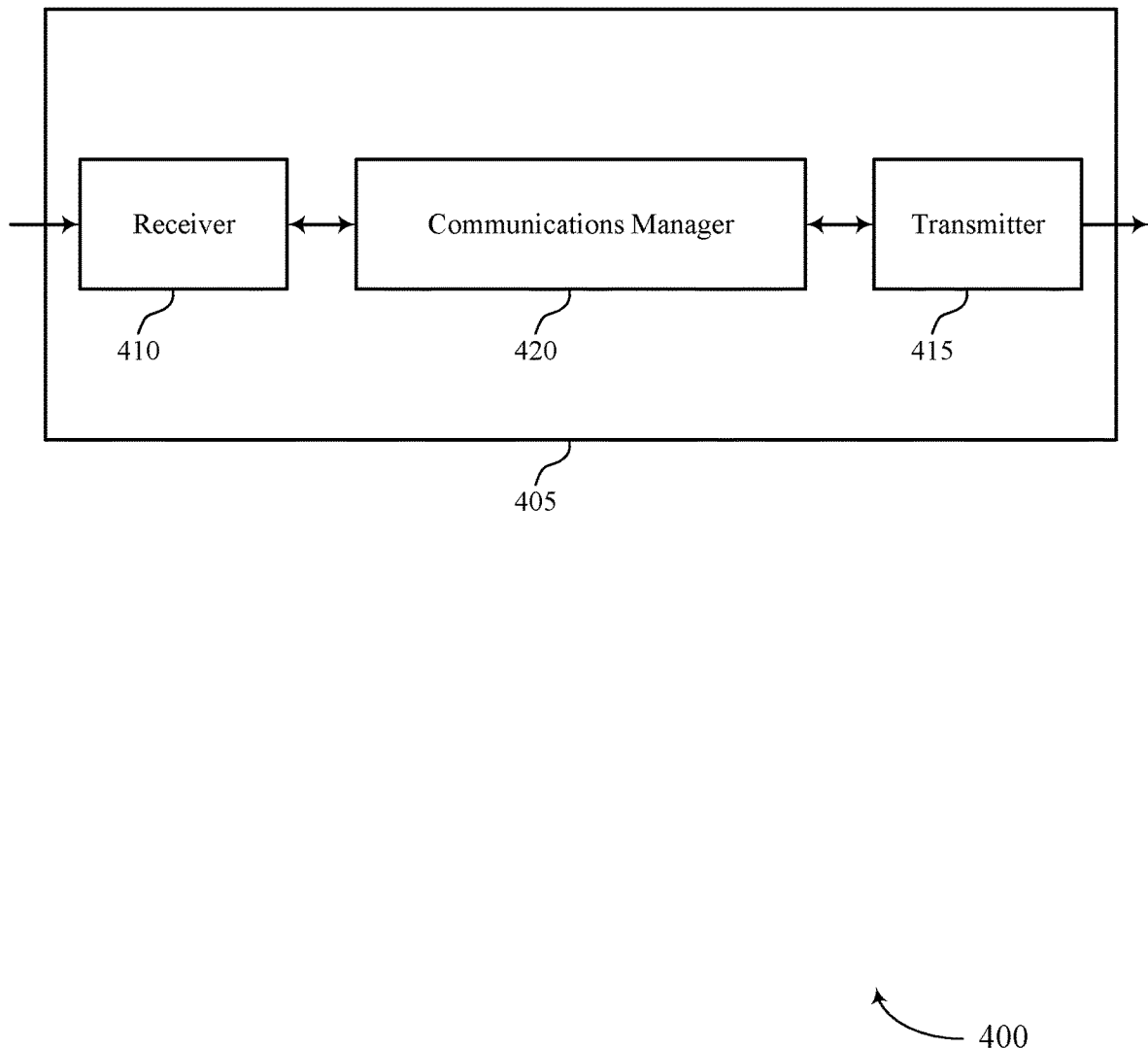
FIGS. 4 and 5 show block diagrams of devices that support resource selection associated with two-step random access procedures in accordance with aspects of the present disclosure.

FIG. 4 shows a block diagram 400 of a device 405 that supports resource selection associated with two-step random access procedures in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to resource selection associated with two-step random access procedures). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to resource selection associated with two-step random access procedures). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of resource selection associated with two-step random access procedures as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for identifying information for transmitting to a base station of a non-terrestrial network. The communications manager 420 may be configured as or otherwise support a means for identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The communications manager 420 may be configured as or otherwise support a means for transmitting, to the base station, a message over the one or more resources allocated for the information based on identifying the one or more resources. By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced power consumption when performing random access procedures in a non-terrestrial network, more efficient utilization of communication resources for random access procedure in the non-terrestrial network.

Figure 5:
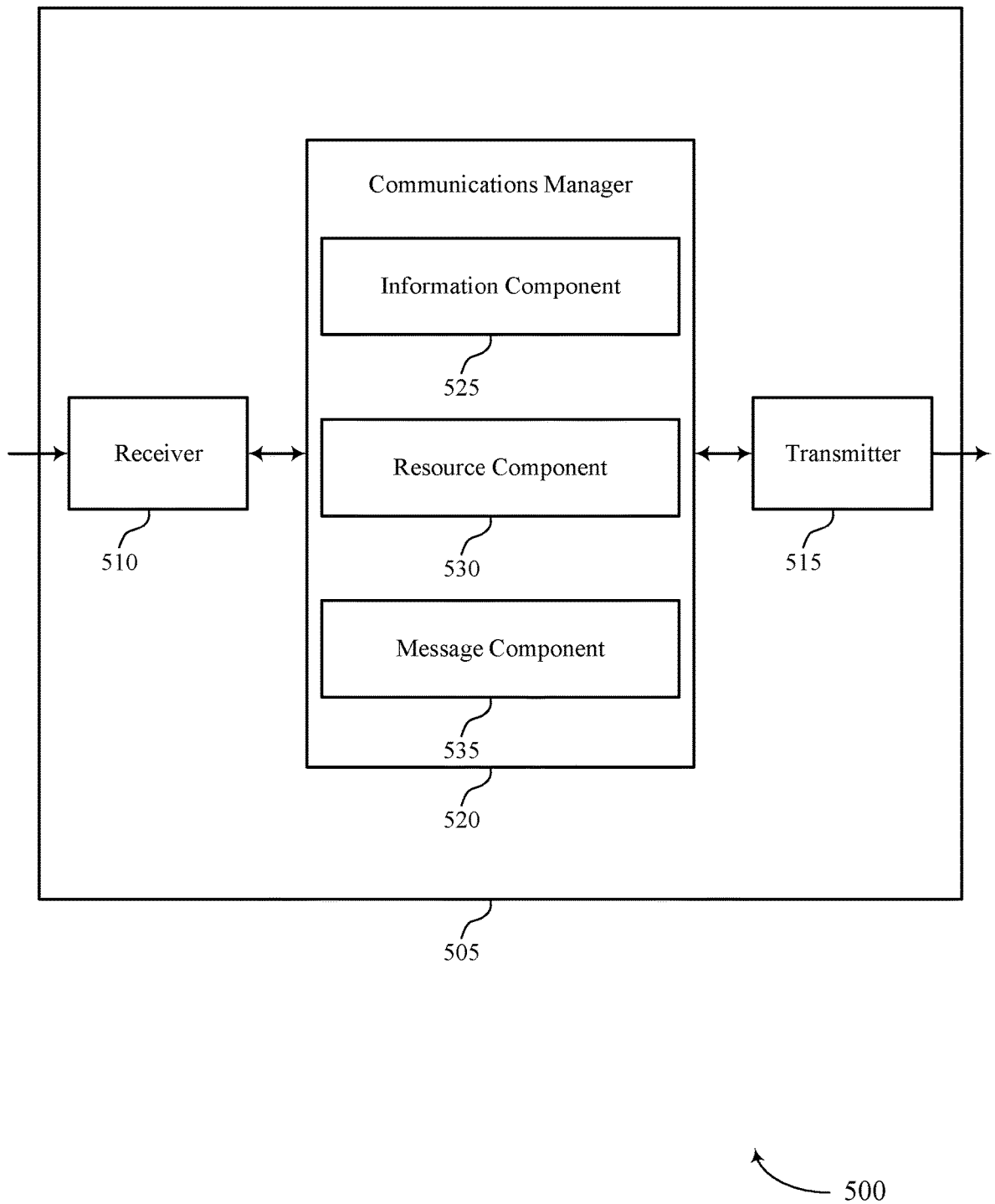

FIG. 5 shows a block diagram 500 of a device 505 that supports resource selection associated with two-step random access procedures in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource selection associated with two-step random access procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource selection associated with two-step random access procedures). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of resource selection associated with two-step random access procedures as described herein. For example, the communications manager 520 may include an information component 525, a resource component 530, a message component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The information component 525 may be configured as or otherwise support a means for identifying information for transmitting to a base station of a non-terrestrial network. The resource component 530 may be configured as or otherwise support a means for identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The message component 535 may be configured as or otherwise support a means for transmitting, to the base station, a message over the one or more resources allocated for the information based on identifying the one or more resources.

Figure 6:
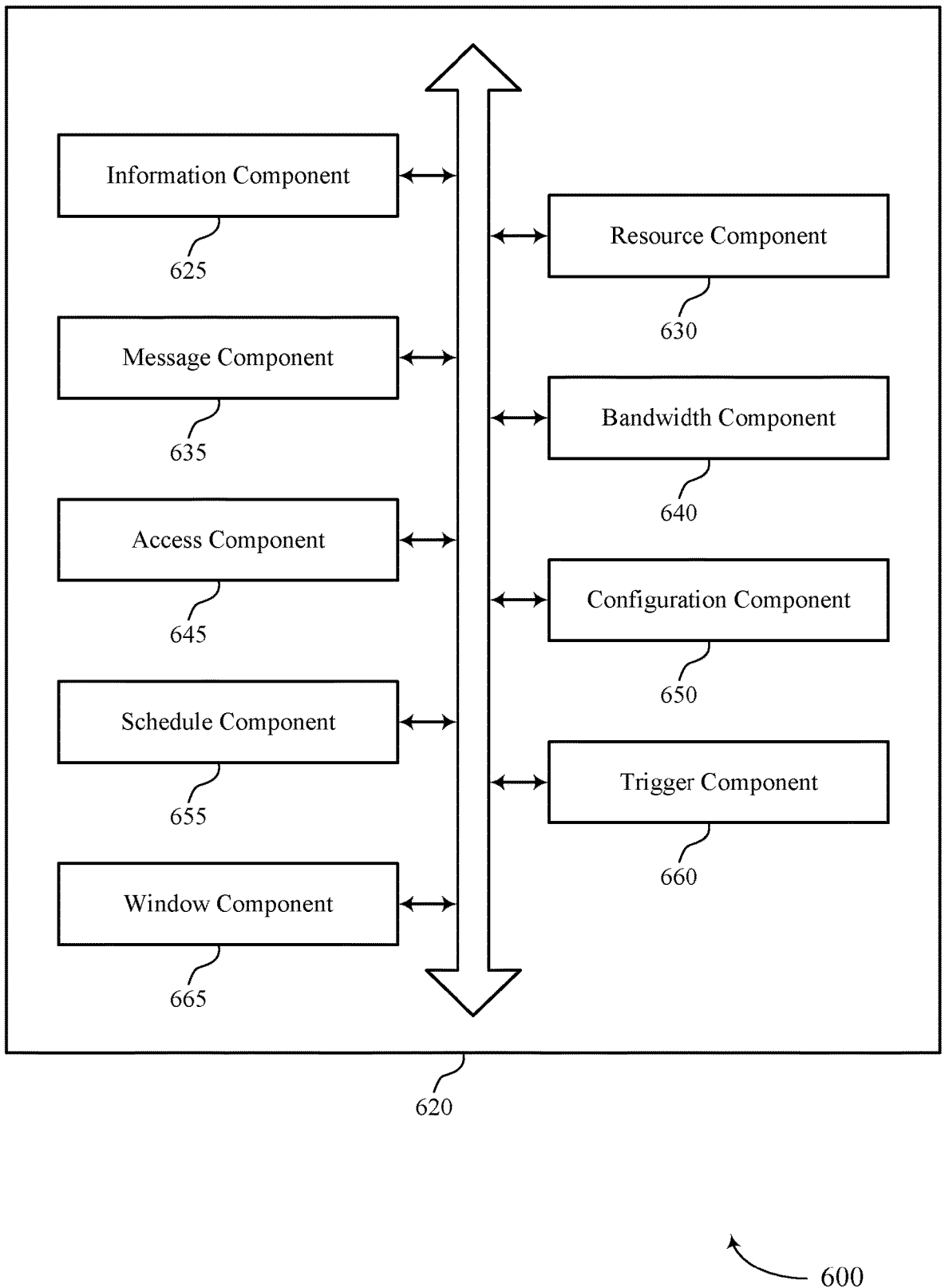
FIG. 6 shows a block diagram of a communications manager that supports resource selection associated with two-step random access procedures in accordance with aspects of the present disclosure.

FIG. 6 shows a block diagram 600 of a communications manager 620 that supports resource selection associated with two-step random access procedures in accordance with aspects of the present disclosure. The communications manager 620 may be an example of aspects of a communications manager 420, a communications manager 520, or both, as described herein. The communications manager 620, or various components thereof, may be an example of means for performing various aspects of resource selection associated with two-step random access procedures as described herein. For example, the communications manager 620 may include an information component 625, a resource component 630, a message component 635, a bandwidth component 640, an access component 645, a configuration component 650, a schedule component 655, a trigger component 660, a window component 665, or any combination thereof. Each of these components may communicate, directly or indirectly, with one another (e.g., via one or more buses).

The communications manager 620 may support wireless communication at a UE in accordance with examples as disclosed herein. The information component 625 may be configured as or otherwise support a means for identifying information for transmitting to a base station of a non-terrestrial network. The resource component 630 may be configured as or otherwise support a means for identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The message component 635 may be configured as or otherwise support a means for transmitting, to the base station, a message over the one or more resources allocated for the information based on identifying the one or more resources.

In some examples, the bandwidth component 640 may be configured as or otherwise support a means for identifying a BWP allocated for a random access procedure, where the BWP includes one or more random access channel resources for a two-step random access procedure and one or more random access channel resources for a four-step random access procedure. In some examples, the access component 645 may be configured as or otherwise support a means for initiating the two-step random access procedure for the BWP based on a criterion, where the transmitting of the message is based on initiating the two-step random access procedure. In some examples, the trigger component 660 may be configured as or otherwise support a means for determining whether one or more conditions associated with a communication link between the UE and the base station over the non-terrestrial network satisfy the criterion based on identifying the BWP, where initiating the two-step random access procedure is based on determining whether the one or more conditions satisfy the criterion.

In some examples, the criterion includes a RSRP parameter configured for the non-terrestrial network satisfying a threshold, a power class parameter associated with the UE, a type of the UE, a RTD between the UE and the base station satisfying a threshold, a delay offset parameter satisfying a threshold, a time and frequency synchronization-compensation parameter satisfying a threshold, a GNSS capability of the UE, a type of the base station, an elevation angle of the base station, or a requested-delay parameter satisfying a threshold, or a combination thereof. In some examples, the one or more resources comprise one or more types of uplink resources including PRACH resources or PUSCH resources for a random access procedure, an SR, or a configured grant, or a combination thereof. In some examples, the information for transmitting to the base station includes a random access request. In some examples, transmitting the message includes transmitting a random access request message that includes a random access preamble and an uplink payload over the one or more resources allocated for the two-step random access procedure.

The window component 665 may be configured as or otherwise support a means for monitoring a response window based on transmitting the random access request message. In some examples, the message component 635 may be configured as or otherwise support a means for receiving, from the base station of the non-terrestrial network, a random access response message of the two-step random access procedure during the response window. In some examples, the information for transmitting to the base station comprises an SR. In some examples, the resource component 630 may be configured as or otherwise support a means for determining whether one or more resources on a PUCCH are configured to communicate a SR, the message including the SR, where the transmitting of the message is based on determining whether the one or more resources on the PUCCH are configured to communicate the SR.

The access component 645 may be configured as or otherwise support a means for selecting to use the two-step random access procedure over an SR to establish a communication link with the base station, where the UE is capable of using the two-step random access procedure or a four-step random access procedure, where the transmitting of the message is based on selecting to use the two-step random access procedure. In some examples, the access component 645 may be configured as or otherwise support a means for selecting to use the two-step random access procedure based at least in part on a condition the UE meets to use the two-step random access procedure over the four-step random access procedure. In some examples, the UE transmits the message over the one or more resources allocated for the two-step random access procedure when the one or more resources on the PUCCH are not configured to communicate the SR or are configured but the UE is unable to send the scheduling request (e.g., configured but not allowed to send the triggered SR). In some examples, the bandwidth component 640 may be configured as or otherwise support a means for determining, in a first BWP, an absence of a PUCCH resource for transmitting the message comprising an SR. In some examples, the bandwidth component 640 may be configured as or otherwise support a means for switching from the first BWP to a second BWP based on the determining of the absence of the PUCCH resource for the SR in the first BWP, where the second BWP includes the one or more resources allocated for the two-step random access procedure, where the transmitting of the message includes transmitting a buffer status report or uplink data, or both, over the one or more resources allocated for the two-step random access procedure.

The configuration component 650 may be configured as or otherwise support a means for receiving a configuration indicating a random access channel resource and a PUCCH resource for a SR. In some examples, the schedule component 655 may be configured as or otherwise support a means for transmitting an SR on the PUCCH resource based on selecting the random access channel resource corresponding to a four-step random access procedure or transmitting a BSR on the random access channel resource based on selecting the random access channel resource corresponding to the two-step random access procedure. In some examples, transmitting the message includes transmitting a buffer status report.

In some examples, the configuration component 650 may be configured as or otherwise support a means for transmitting the message in a PUSCH resource for a configured grant or the two-step random access procedure. In some examples, the two-step random access procedure is contention-free. In some examples, resources associated with the configured grant correspond to a first priority for communicating the information and one or more resources of the two-step random access procedure corresponds to a second priority for communicating the information different than the first priority.

Figure 7:
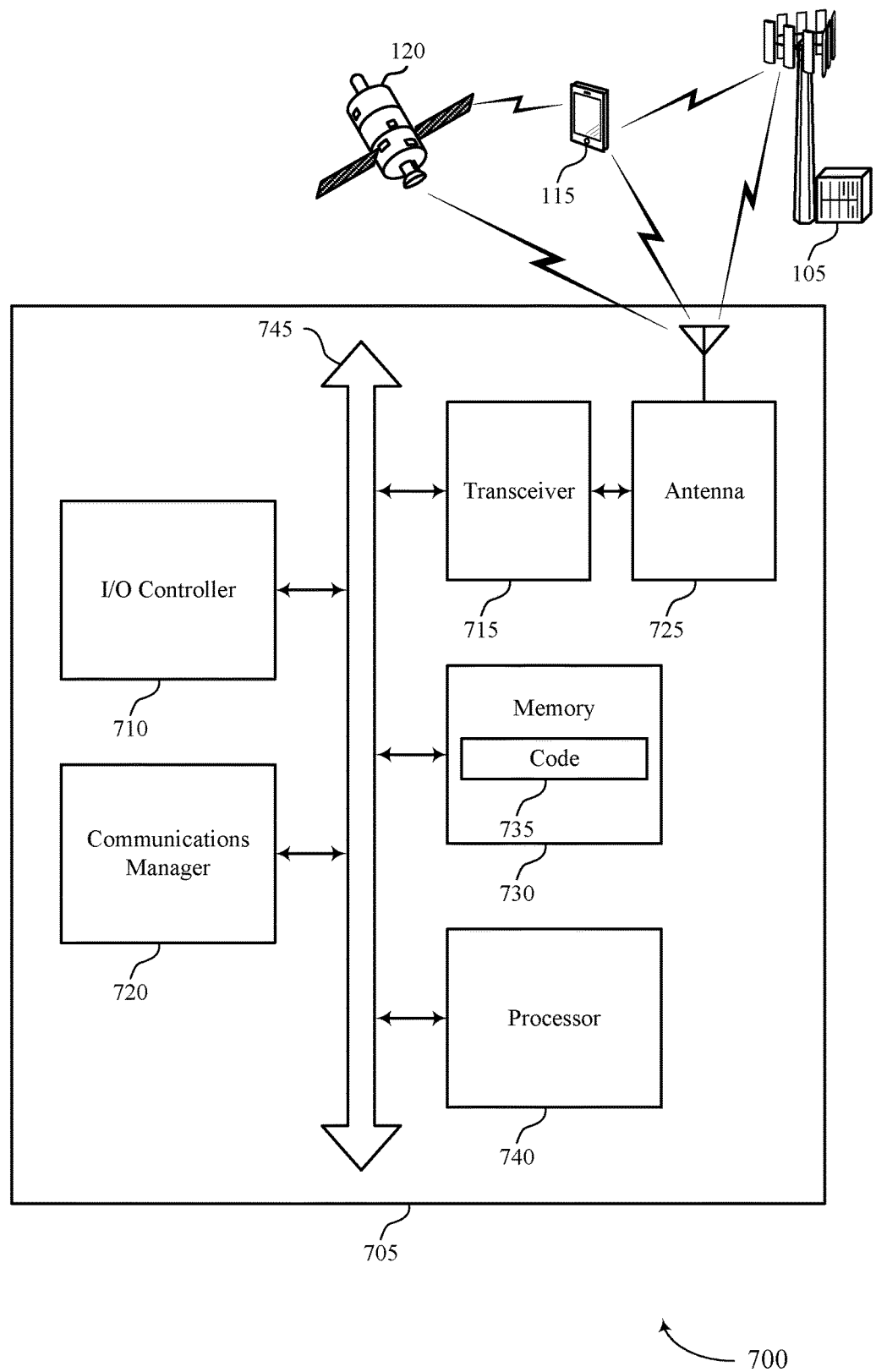
FIG. 7 shows a diagram of a system including a device that supports resource selection associated with two-step random access procedures in accordance with aspects of the present disclosure.

FIG. 7 shows a diagram of a system 700 including a device 705 that supports resource selection associated with two-step random access procedures in accordance with aspects of the present disclosure. The device 705 may be an example of or include the components of a device 405, a device 505, or a UE 115 as described herein. The device 705 may communicate wirelessly with one or more base stations 105, UEs 115, satellites 120 or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting resource selection associated with two-step random access procedures). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for identifying information for transmitting to a base station of a non-terrestrial network. The communications manager 720 may be configured as or otherwise support a means for identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The communications manager 720 may be configured as or otherwise support a means for transmitting, to the base station, a message over the one or more resources allocated for the information based on identifying the one or more resources. By including or configuring the communications manager 720 in accordance with examples as described herein, the device 705 may support techniques for improved communication reliability, reduced latency, reduced power consumption, more efficient utilization of communication resources, among other benefits when performing random access procedures in a non-terrestrial network.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of resource selection associated with two-step random access procedures as described herein, or the processor 740 and the memory 730 may be otherwise configured to perform or support such operations.

Figure 8:
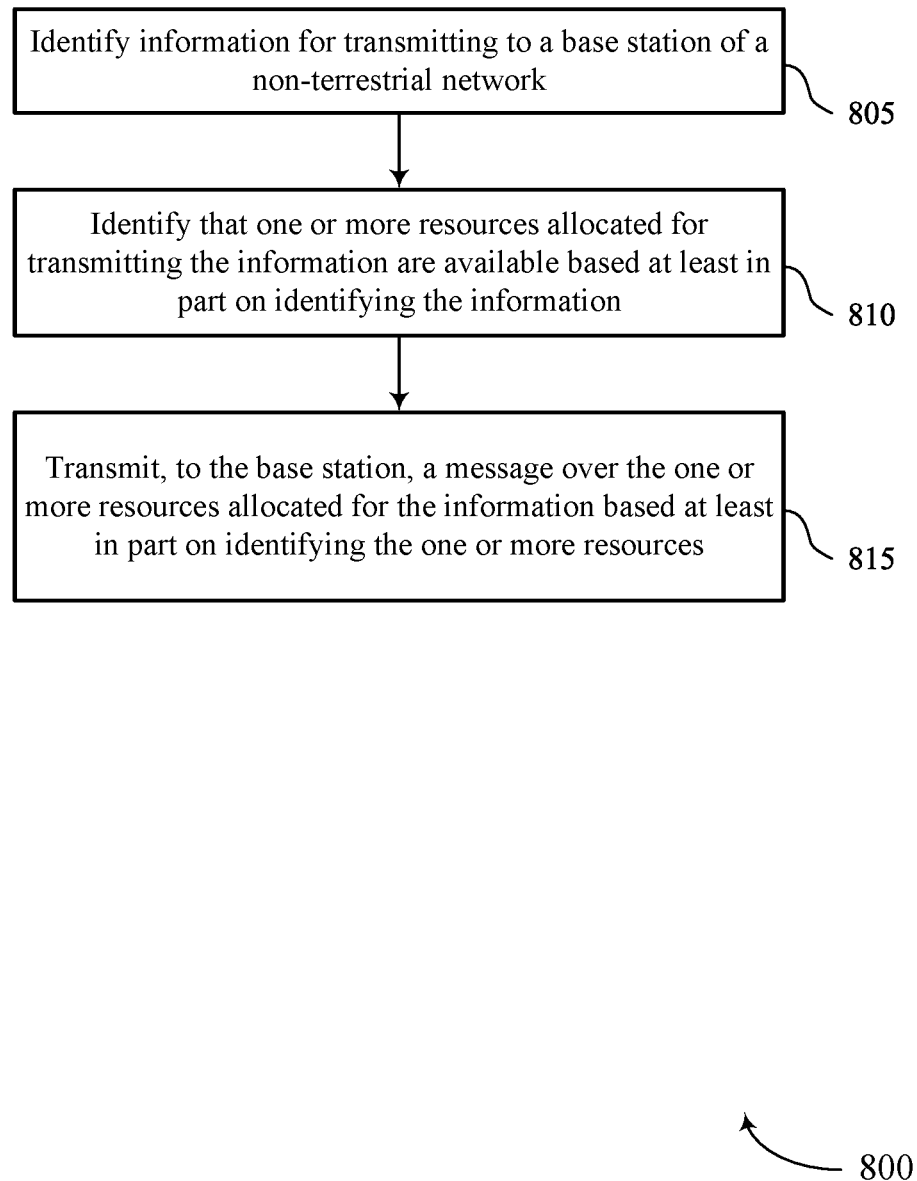
FIGS. 8 through 12 show flowcharts illustrating methods that support resource selection associated with two-step random access procedures in accordance with aspects of the present disclosure.

FIG. 8 shows a flowchart illustrating a method 800 that supports resource selection associated with two-step random access procedures in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include identifying information for transmitting to a base station of a non-terrestrial network. The operations of 805 may be performed in accordance with examples as disclosed herein. In some examples, aspects of the operations of 805 may be performed by an information component 625 as described with reference to FIG. 6.

At 810, the method may include identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The operations of 810 may be performed in accordance with examples as disclosed herein. In some examples, aspects of the operations of 810 may be performed by a resource component 630 as described with reference to FIG. 6.

At 815, the method may include transmitting, to the base station, a message over the one or more resources allocated for the information based on identifying the one or more resources. The operations of 815 may be performed in accordance with examples as disclosed herein. In some examples, aspects of the operations of 815 may be performed by a message component 635 as described with reference to FIG. 6.

Figure 9:
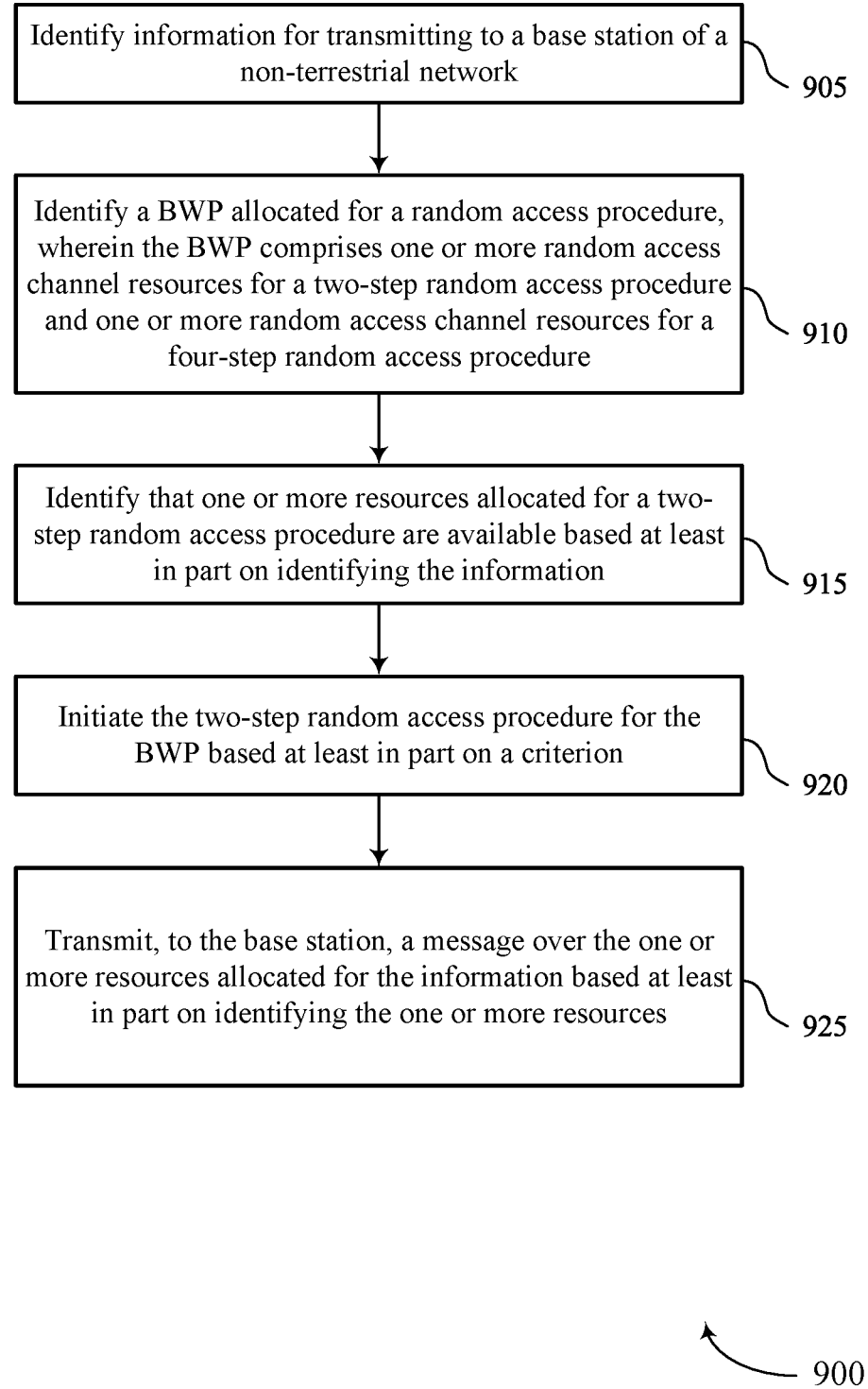

FIG. 9 shows a flowchart illustrating a method 900 that supports resource selection associated with two-step random access procedures in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include identifying information for transmitting to a base station of a non-terrestrial network. The operations of 905 may be performed in accordance with examples as disclosed herein. In some examples, aspects of the operations of 905 may be performed by an information component 625 as described with reference to FIG. 6.

At 910, the method may include identifying a BWP allocated for a random access procedure, where the BWP includes one or more random access channel resources for a two-step random access procedure and one or more random access channel resources for a four-step random access procedure. The operations of 910 may be performed in accordance with examples as disclosed herein. In some examples, aspects of the operations of 910 may be performed by a bandwidth component 640 as described with reference to FIG. 6.

At 915, the method may include identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The operations of 915 may be performed in accordance with examples as disclosed herein. In some examples, aspects of the operations of 915 may be performed by a resource component 630 as described with reference to FIG. 6.

At 920, the method may include initiating the two-step random access procedure for the BWP based on a criterion. The operations of 920 may be performed in accordance with examples as disclosed herein. In some examples, aspects of the operations of 920 may be performed by an access component 645 as described with reference to FIG. 6.

At 925, the method may include transmitting, to the base station, a message over the one or more resources allocated for the information based on identifying the one or more resources. The operations of 925 may be performed in accordance with examples as disclosed herein. In some examples, aspects of the operations of 925 may be performed by a message component 635 as described with reference to FIG. 6.

Figure 10:
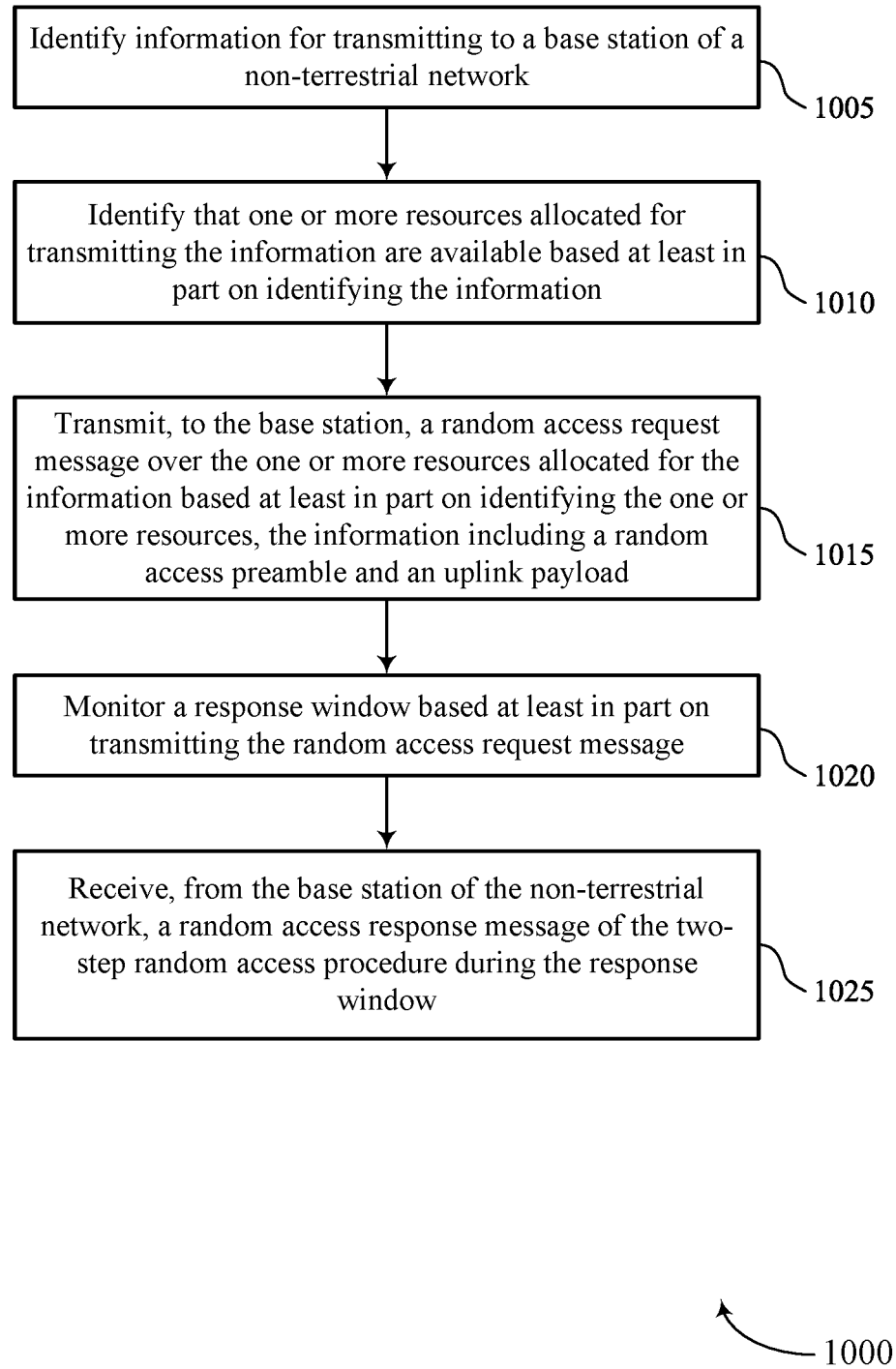

FIG. 10 shows a flowchart illustrating a method 1000 that supports resource selection associated with two-step random access procedures in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include identifying information for transmitting to a base station of a non-terrestrial network. The operations of 1005 may be performed in accordance with examples as disclosed herein. In some examples, aspects of the operations of 1005 may be performed by an information component 625 as described with reference to FIG. 6.

At 1010, the method may include identifying that one or more resources allocated for transmitting the information are available based on identifying the information. In some examples, the one or more resources comprise one or more types of uplink resources including PRACH resources or PUSCH resources for the random access procedure, a PUSCH for an SR, or a PUCCH for a configured grant, or a combination thereof. The operations of 1010 may be performed in accordance with examples as disclosed herein. In some examples, aspects of the operations of 1010 may be performed by a resource component 630 as described with reference to FIG. 6.

At 1015, the method may include transmitting, to the base station, a random access request message over the one or more resources allocated for the information based on identifying the one or more resources, the information including a random access preamble and an uplink data payload. The operations of 1015 may be performed in accordance with examples as disclosed herein. In some examples, aspects of the operations of 1015 may be performed by a message component 635 as described with reference to FIG. 6.

At 1020, the method may include monitoring a response window based on transmitting the random access request message. The operations of 1020 may be performed in accordance with examples as disclosed herein. In some examples, aspects of the operations of 1020 may be performed by a window component 665 as described with reference to FIG. 6.

At 1025, the method may include receiving, from the base station of the non-terrestrial network, a random access response message of the two-step random access procedure during the response window. The operations of 1025 may be performed in accordance with examples as disclosed herein. In some examples, aspects of the operations of 1025 may be performed by a message component 635 as described with reference to FIG. 6.

Figure 11:
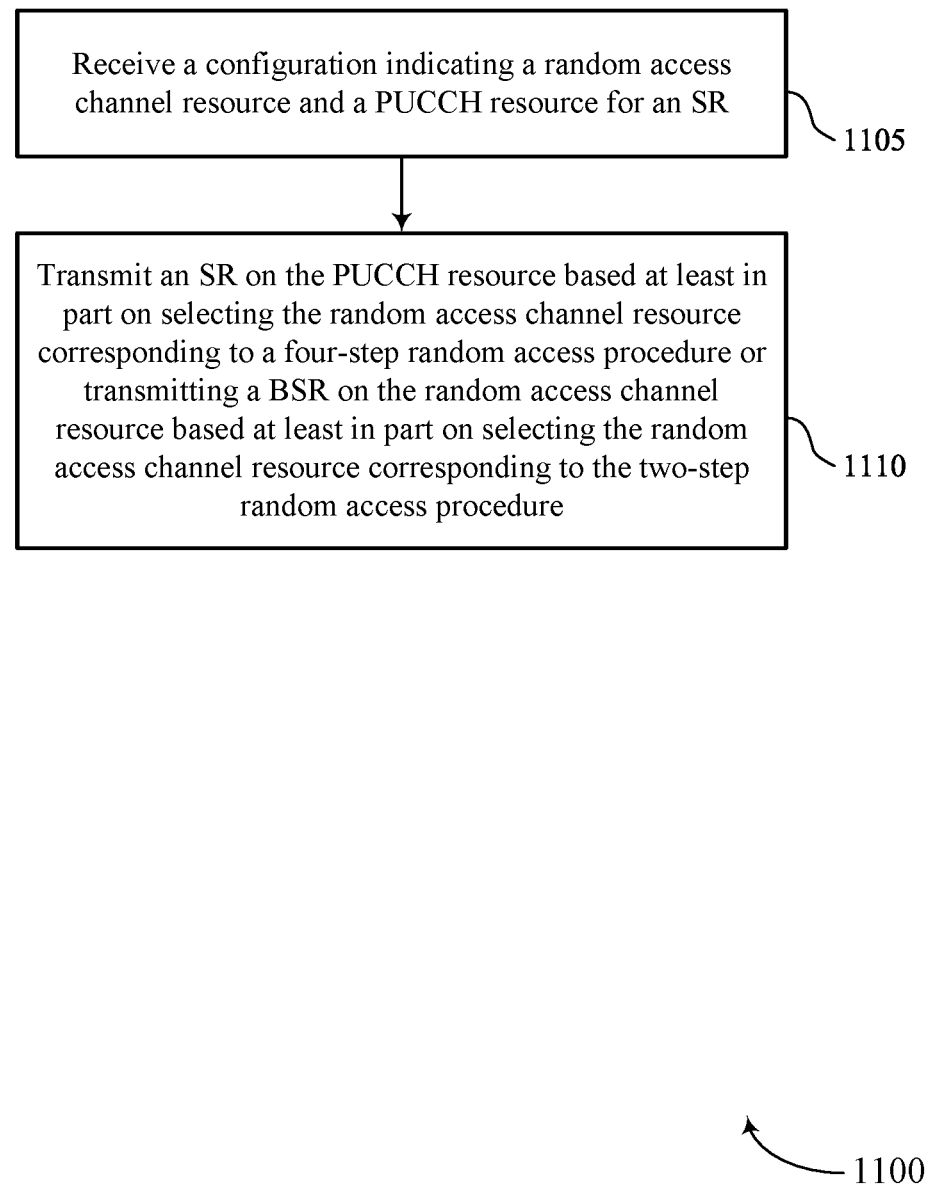

FIG. 11 shows a flowchart illustrating a method 1100 that supports resource selection associated with two-step random access procedures in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1105, the method may include receiving a configuration indicating a random access channel resource and a PUCCH resource for an SR. The operations of 1105 may be performed in accordance with examples as disclosed herein. In some examples, aspects of the operations of 1105 may be performed by a configuration component 650 as described with reference to FIG. 6.

At 1110, the method may include transmitting an SR on the PUCCH resource based on selecting the random access channel resource corresponding to a four-step random access procedure or transmitting a BSR on the random access channel resource based on selecting the random access channel resource corresponding to the two-step random access procedure. The operations of 1110 may be performed in accordance with examples as disclosed herein. In some examples, aspects of the operations of 1110 may be performed by a schedule component 655 as described with reference to FIG. 6.

Figure 12:
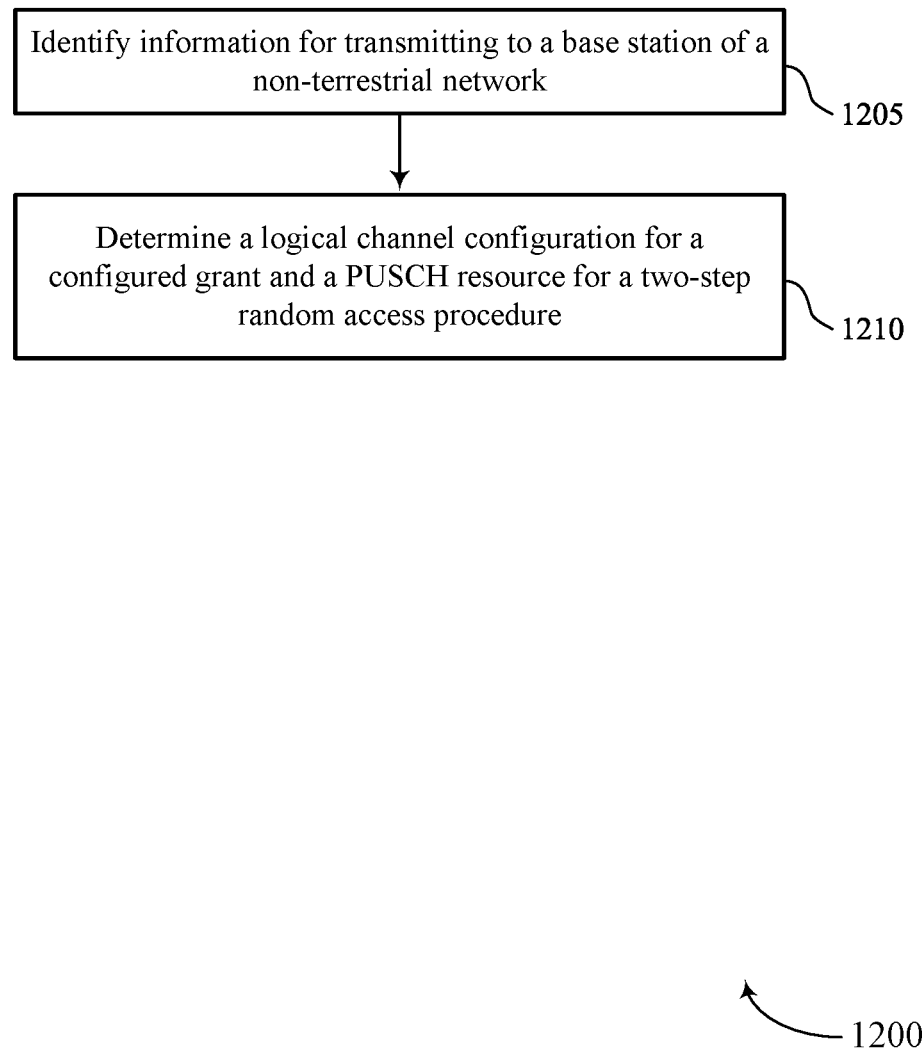

FIG. 12 shows a flowchart illustrating a method 1200 that supports resource selection associated with two-step random access procedures in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include identifying information for transmitting to a base station of a non-terrestrial network. The operations of 1205 may be performed in accordance with examples as disclosed herein. In some examples, aspects of the operations of 1205 may be performed by an information component 625 as described with reference to FIG. 6.

At 1210, the method may include transmitting a message in a PUSCH resource for a configured grant or a two-step random access procedure. The operations of 1210 may be performed in accordance with examples as disclosed herein.

In some examples, aspects of the operations of 1210 may be performed by a configuration component 650 as described with reference to FIG. 6.

The following provides an overview of aspects of the present disclosure:

Aspect 1: A method for wireless communication at a UE, comprising: identifying information for transmitting to a base station of a non-terrestrial network; identifying that one or more resources allocated for transmitting the information are available based at least in part on identifying the information, wherein the one or more resources comprise one or more types of uplink resources including PRACH resources or PUSCH resources for the random access procedure, a PUSCH for an SR, or a PUCCH for a configured grant, or a combination thereof; and transmitting, to the base station, a message over the one or more resources allocated for the information based at least in part on identifying the one or more resources.

Aspect 2: The method of aspect 1, further comprising: identifying a BWP allocated for a random access procedure, wherein the BWP comprises one or more RACH resources for a two-step random access procedure and one or more RACH resources for a four-step random access procedure; and initiating the two-step random access procedure for the BWP based at least in part on a criterion, wherein the transmitting of the message is based at least in part on initiating the two-step random access procedure.

Aspect 3: The method of aspect 2, further comprising: determining whether one or more conditions associated with a communication link between the UE and the base station over the non-terrestrial network satisfy the criterion based at least in part on identifying the BWP, wherein initiating the two-step random access procedure is based at least in part on determining whether the one or more conditions satisfy the criterion.

Aspect 4: The method of any of aspects 2 through 3, wherein the criterion comprises a reference signal received power parameter configured for the non-terrestrial network satisfying a threshold, a power class parameter associated with the UE, a type of the UE, a RTD between the UE and the base station satisfying a threshold, a delay offset parameter satisfying a threshold, a time and frequency synchronization-compensation parameter satisfying a threshold, a GNSS capability of the UE, a type of the base station, an elevation angle of the base station, or a requested-delay parameter satisfying a threshold, or a combination thereof.

Aspect 5: The method of aspect 4, wherein the one or more resources comprise one or more types of uplink resources including PRACH resources or PUSCH resources for the random access procedure, an SR, or a configured grant, or a combination thereof.

Aspect 6: The method of any of aspects 1 through 5, wherein the information for transmitting to the base station comprises a random access request; and transmitting the message comprises transmitting a random access request message over the one or more resources allocated for the information, wherein the information includes a random access preamble and an uplink payload.

Aspect 7: The method of aspect 6, further comprising: monitoring a response window based at least in part on transmitting the random access request message; and receiving, from the base station of the non-terrestrial network, a random access response message of a two-step random access procedure during the response window.

Aspect 8: The method of any of aspects 1 through 7, wherein the information for transmitting to the base station comprises an SR, the method further comprising: determining whether one or more resources on a PUCCH are configured to communicate the SR, the message comprising the SR, wherein the transmitting of the message is based at least in part on determining whether the one or more resources on the PUCCH are configured to communicate the SR.

Aspect 9: The method of aspect 8, further comprising: selecting to use a two-step random access procedure over the SR to establish a communication link with the base station, wherein the UE is capable of using the two-step random access procedure or a four-step random access procedure, wherein the transmitting of the message is based at least in part on selecting to use the two-step random access procedure.

Aspect 10: The method of aspect 9, wherein the selecting to use the two-step random access procedure is based at least in part on a condition the UE meets to use the two-step random access procedure over the four-step random access procedure.

Aspect 11: The method of any of aspects 8 through 10, wherein the UE transmits the message over the one or more resources allocated for the two-step random access procedure when the one or more resources on the PUCCH are not configured to communicate the SR or are configured but the UE is unable to send the scheduling request.

Aspect 12: The method of any of aspects 1 through 11, further comprising: determining, in a first BWP, an absence of a PUCCH resource for transmitting the message comprising an SR; switching from the first BWP to a second BWP based at least in part on the determining of the absence of the PUCCH resource for the SR in the first BWP, wherein the second BWP comprises the one or more resources allocated for a two-step random access procedure, wherein the transmitting of the message comprises transmitting a BSR or uplink data, or both, over the one or more resources allocated for the two-step random access procedure.

Aspect 13: The method of any of aspects 1 through 12, further comprising: receiving a configuration indicating a random access channel resource and a PUCCH resource for an SR; and transmitting an SR on the PUCCH resource based at least in part on selecting the random access channel resource corresponding to a four-step random access procedure or transmitting a BSR on the random access channel resource based at least in part on selecting the random access channel resource corresponding to a two-step random access procedure.

Aspect 14: The method of any of aspects 1 through 13, wherein transmitting the message comprises transmitting a BSR.

Aspect 15: The method of any of aspects 1 through 14, further comprising: transmitting the message in a PUSCH resource for a configured grant or a two-step random access procedure.

Aspect 16: The method of aspect 15, wherein the two-step random access procedure is contention free.

Aspect 17: The method of any of aspects 15 through 16, wherein resources associated with the configured grant correspond to a first priority for communicating the information and one or more resources of the two-step random access procedure corresponds to a second priority for communicating the information different than the first priority.

Aspect 18: An apparatus for wireless communication at a UE, comprising a processor, memory coupled with the processor, and instructions stored in the memory and operable, when executed by the processor, to cause the apparatus to perform a method of any of aspects 1 through 17.

Aspect 19: An apparatus for wireless communication at a UE, comprising at least one means for performing a method of any of aspects 1 through 17.

Aspect 20: A non-transitory computer-readable medium storing code for wireless communication at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
identifying information for transmitting to a network entity of a non-terrestrial network;
identifying that one or more resources allocated for transmitting the information are available based at least in part on identifying the information, wherein the one or more resources comprise one or more types of uplink resources including physical random access channel resources or physical uplink shared channel resources for a random access procedure, a physical uplink control channel resource for a scheduling request, or a physical uplink control channel resource for a configured grant, or a combination thereof;
switching from a first bandwidth part to a second bandwidth part allocated for a two-step random access procedure based at least in part on an absence of the physical uplink control channel resource for transmitting a message including the scheduling request in the first bandwidth part; and
transmitting, to the network entity, the message over the one or more resources allocated for the information and based at least in part on the switching.

2. The method of claim 1, further comprising:
identifying the first bandwidth part or the second bandwidth part, or both allocated for the random access procedure, wherein the first bandwidth part or the second bandwidth part, or both comprises one or more random access channel resources for the two-step random access procedure and one or more random access channel resources for a four-step random access procedure; and
initiating the two-step random access procedure for the first bandwidth part or the second bandwidth part, or both based at least in part on a criterion, wherein the transmitting of the message is based at least in part on initiating the two-step random access procedure.

3. The method of claim 2, further comprising:
determining whether one or more conditions associated with a communication link between the UE and the network entity over the non-terrestrial network satisfy the criterion based at least in part on identifying the first bandwidth part or the second bandwidth part, or both, wherein initiating the two-step random access procedure is based at least in part on determining whether the one or more conditions satisfy the criterion.

4. The method of claim 2, wherein the criterion comprises a reference signal received power parameter configured for the non-terrestrial network satisfying a threshold, a power class parameter associated with the UE, a type of the UE, a round-trip delay between the UE and the network entity satisfying a threshold, a delay offset parameter satisfying a threshold, a time and frequency synchronization-compensation parameter satisfying a threshold, a Global Navigation Satellite System (GNSS) capability of the UE, a type of the network entity, an elevation angle of the network entity, or a requested-delay parameter satisfying a threshold, or a combination thereof.

5. The method of claim 1, wherein the information comprises a random access request.

6. The method of claim 1, wherein transmitting the message comprises transmitting a random access request message over the one or more resources allocated for the information, wherein the information includes a random access preamble and an uplink payload.

7. The method of claim 6, further comprising:
monitoring a response window based at least in part on transmitting the random access request message; and
receiving, from the network entity of the non-terrestrial network, a random access response message of a two-step random access procedure during the response window.

8. The method of claim 1, wherein:
the information for transmitting to the network entity comprises the scheduling request, the method further comprising:
determining whether one or more resources on a physical uplink control channel are configured to communicate the scheduling request, the message comprising the scheduling request, wherein the transmitting of the message is based at least in part on determining whether the one or more resources on the physical uplink control channel are configured to communicate the scheduling request.

9. The method of claim 8, further comprising:
selecting to use a two-step random access procedure over the scheduling request to establish a communication link with the network entity, wherein the UE is capable of using the two-step random access procedure or a four-step random access procedure, wherein the transmitting of the message is based at least in part on selecting to use the two-step random access procedure.

10. The method of claim 9, wherein the selecting to use the two-step random access procedure is based at least in part on a condition the UE meets to use the two-step random access procedure over the four-step random access procedure.

11. The method of claim 9, wherein the UE transmits the message over the one or more resources allocated for the two-step random access procedure when the one or more resources on the physical uplink control channel are not configured to communicate the scheduling request or are configured but the UE is unable to send the scheduling request.

12. The method of claim 1, further comprising:
determining, in the first bandwidth part, the absence of the physical uplink control channel resource for transmitting the message comprising the scheduling request, wherein the second bandwidth part comprises the one or more resources allocated for a two-step random access procedure, and wherein the transmitting of the message comprises transmitting a buffer status report or uplink data, or both, over the one or more resources allocated for the two-step random access procedure.

13. The method of claim 1, further comprising:
receiving a configuration indicating a random access channel resource and a physical uplink control channel resource for the scheduling request; and
transmitting the scheduling request on the physical uplink control channel resource based at least in part on selecting the random access channel resource corresponding to a four-step random access procedure or transmitting a buffer status report on the random access channel resource based at least in part on selecting the random access channel resource corresponding to a two-step random access procedure.

14. The method of claim 1, wherein transmitting the message comprises transmitting a buffer status report.

15. The method of claim 1, further comprising:
transmitting the message in a physical uplink shared channel resource for a configured grant or a two-step random access procedure.

16. The method of claim 15, wherein the two-step random access procedure is contention free.

17. The method of claim 15, wherein resources associated with the configured grant correspond to a first priority for communicating the information and one or more resources of the two-step random access procedure corresponds to a second priority for communicating the information different than the first priority.

18. An apparatus for wireless communication, comprising:
a processor;
memory coupled with the processor; and
instructions stored in the memory and operable, when executed by the processor, to cause the apparatus to:
identify information for transmitting to a network entity of a non-terrestrial network;
identify that one or more resources allocated for transmitting the information are available based at least in part on identifying the information, wherein the one or more resources comprise one or more types of uplink resources including physical random access channel resources or physical uplink shared channel resources for a random access procedure, a physical uplink control channel resource for a scheduling request, or a physical uplink control channel resource for a configured grant, or a combination thereof;
switch from a first bandwidth part to a second bandwidth part allocated for a two-step random access procedure based at least in part on an absence of the physical uplink control channel resource for transmitting a message including the scheduling request in the first bandwidth part; and
transmit, to the network entity, the message over the one or more resources allocated for the information and based at least in part on the switch.

19. The apparatus of claim 18, wherein the instructions are further executable by the processor to cause the apparatus to:
identify the first bandwidth part or the second bandwidth part, or both allocated for the random access procedure, wherein the first bandwidth part or the second bandwidth part, or both comprises one or more random access channel resources for the two-step random access procedure and one or more random access channel resources for a four-step random access procedure; and
initiate the two-step random access procedure for the first bandwidth part or the second bandwidth part, or both based at least in part on a criterion, wherein the instructions for transmitting of the message are further executable by the processor based at least in part on initiating the two-step random access procedure.

20. The apparatus of claim 19, wherein the instructions are further executable by the processor to cause the apparatus to:
determine whether one or more conditions associated with a communication link between the apparatus and the network entity over the non-terrestrial network satisfy the criterion based at least in part on identifying the first bandwidth part or the second bandwidth part, or both, wherein the instructions for initiating the two-step random access procedure are further executable by the processor based at least in part on determining whether the one or more conditions satisfy the criterion.

21. The apparatus of claim 19, wherein the criterion comprises a reference signal received power parameter configured for the non-terrestrial network satisfying a threshold, a power class parameter associated with the apparatus, a type of the apparatus, a round-trip delay between the apparatus and the network entity satisfying a threshold, a delay offset parameter satisfying a threshold, a time and frequency synchronization-compensation parameter satisfying a threshold, a Global Navigation Satellite System (GNSS) capability of the apparatus, a type of the network entity, an elevation angle of the network entity, or a requested-delay parameter satisfying a threshold, or a combination thereof.

22. The apparatus of claim 18, wherein the information comprises a random access request.

23. The apparatus of claim 18, wherein the instructions for transmitting the information are further executable by the processor to cause the apparatus to:
transmit a random access request message over the one or more resources allocated for the information, wherein the information includes a random access preamble and an uplink payload.

24. The apparatus of claim 23, wherein the instructions are further executable by the processor to cause the apparatus to:
monitor a response window based at least in part on transmitting the random access request message; and
receive, from the network entity of the non-terrestrial network, a random access response message of a two-step random access procedure during the response window.

25. The apparatus of claim 18, wherein:
the information for transmitting to the network entity comprises the scheduling request; and wherein the instructions are further executable by the processor to cause the apparatus to:
determine whether one or more resources on a physical uplink control channel are configured to communicate the scheduling request, the message comprising the scheduling request, wherein the instructions for transmitting of the message are further executable by the processor based at least in part on determining whether the one or more resources on the physical uplink control channel are configured to communicate the scheduling request.

26. The apparatus of claim 25, wherein the instructions are further executable by the processor to cause the apparatus to:
select to use a two-step random access procedure over the scheduling request to establish a communication link with the network entity, wherein the apparatus is capable of using the two-step random access procedure or a four-step random access procedure, wherein the instructions for transmitting of the message are further executable by the processor based at least in part on selecting to use the two-step random access procedure.

27. The apparatus of claim 26, wherein to select to use the two-step random access procedure is based at least in part on a condition the apparatus meets to use the two-step random access procedure over a four-step random access procedure.

28. The apparatus of claim 25, wherein the apparatus transmits the message over the one or more resources allocated for a two-step random access procedure when the one or more resources on the physical uplink control channel are not configured to communicate the scheduling request or are configured but the apparatus is unable to send the scheduling request.

29. An apparatus for wireless communication, comprising:
  means for identifying information for transmitting to a network entity of a non-terrestrial network;
  means for identifying that one or more resources allocated for transmitting the information are available based at least in part on identifying the information, wherein the one or more resources comprise one or more types of uplink resources including physical random access channel resources or physical uplink shared channel resources for a random access procedure, a physical uplink control channel resource for scheduling request, or a physical uplink control channel resource for a configured grant, or a combination thereof;
  means for switching from a first bandwidth part to a second bandwidth part allocated for a two-step random access procedure based at least in part on an absence of the physical uplink control channel resource for transmitting a message including the scheduling request in the first bandwidth part; and
  means for transmitting, to the network entity, the message over the one or more resources allocated for the information and based at least in part on the switching.

30. A non-transitory computer-readable medium storing code for wireless communication at a user equipment (UE), the code comprising instructions executable by a processor to:
  identify information for transmitting to a network entity of a non-terrestrial network;
  identify that one or more resources allocated for transmitting the information are available based at least in part on identifying the information, wherein the one or more resources comprise one or more types of uplink resources including physical random access channel resources or physical uplink shared channel resources for a random access procedure, a physical uplink control channel resource for a scheduling request, or a physical uplink control channel resource for a configured grant, or a combination thereof;
  switch from a first bandwidth part to a second bandwidth part allocated for a two-step random access procedure based at least in part on an absence of the physical uplink control channel resource for transmitting a message including the scheduling request in the first bandwidth part; and
  transmit, to the network entity, the message over the one or more resources allocated for the information and based at least in part on the switch.

* * * * *